Aug. 25, 1959     J. K. KRUKOWSKI     2,901,048
POTATO HARVESTER AND SEPARATING MEANS THEREFOR
Filed July 6, 1953     9 Sheets-Sheet 7
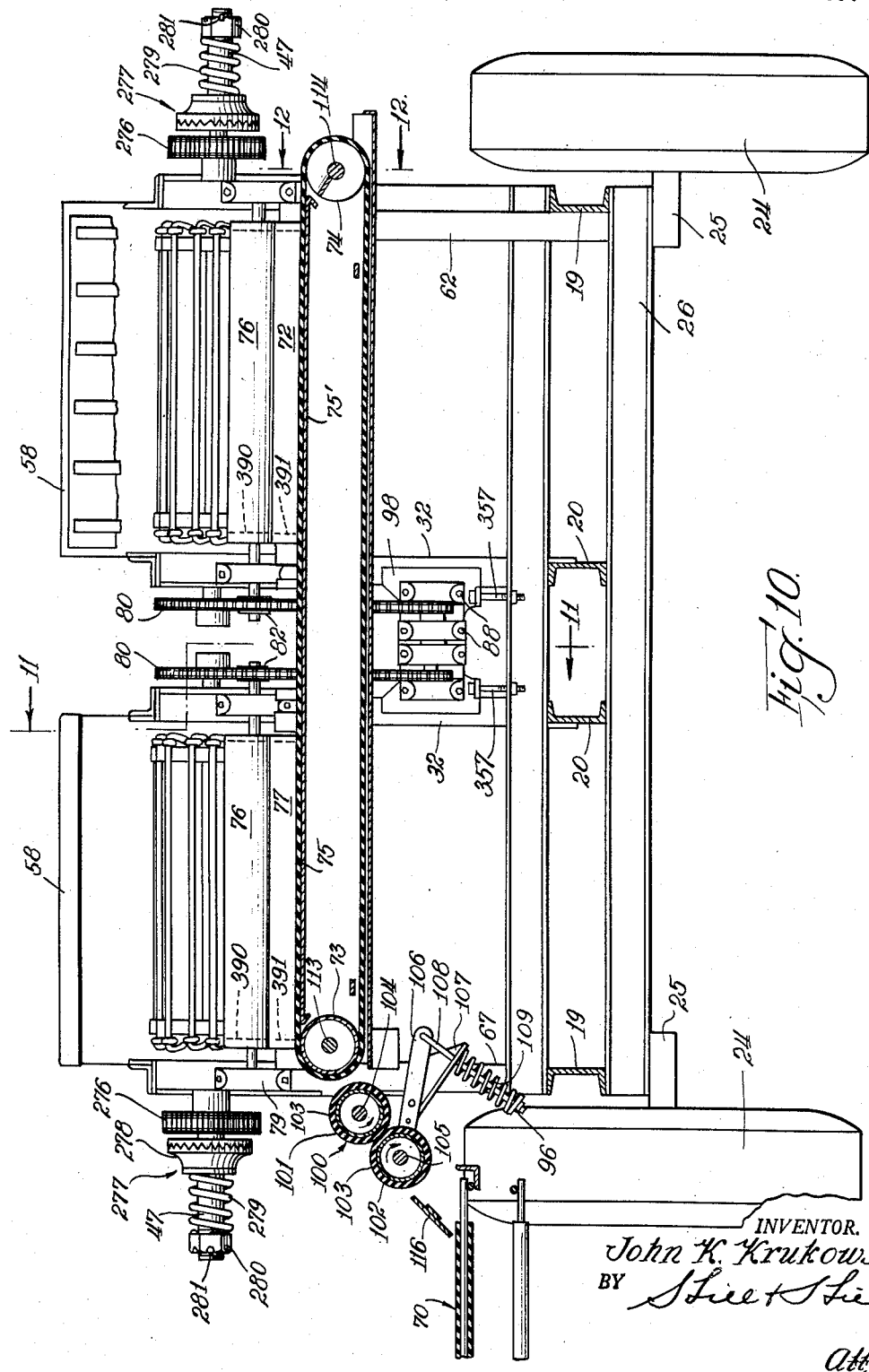
INVENTOR.
John K. Krukowski

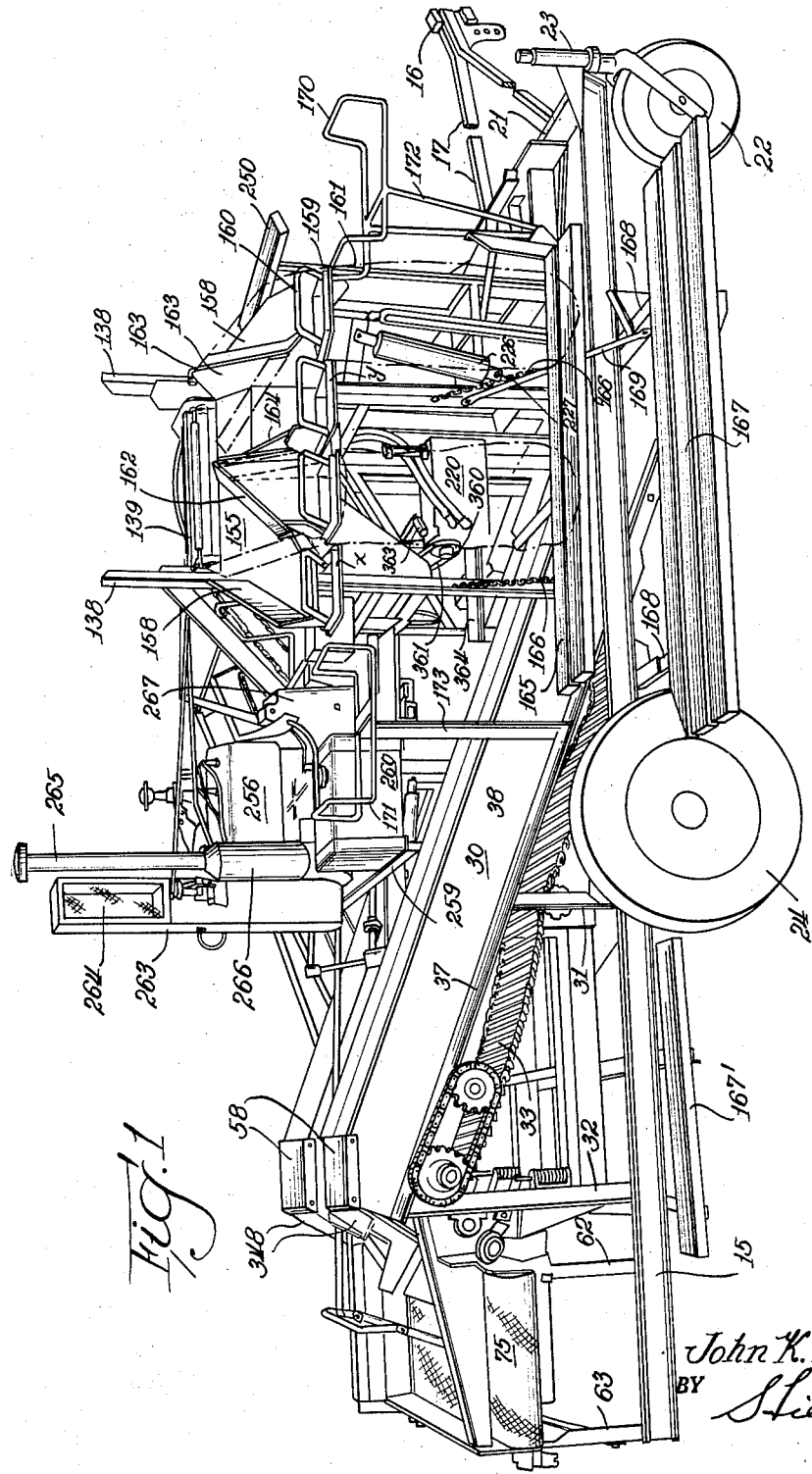

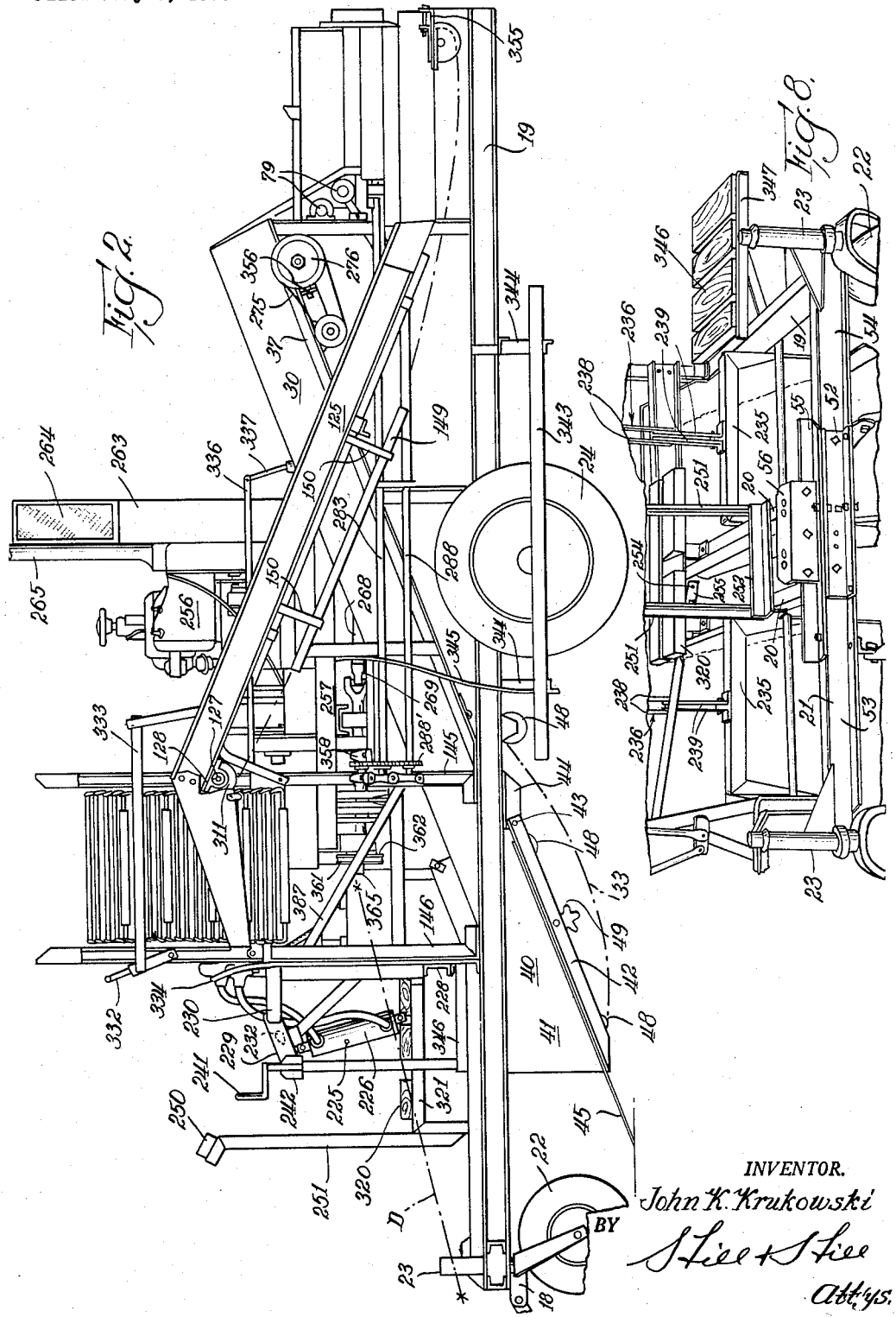

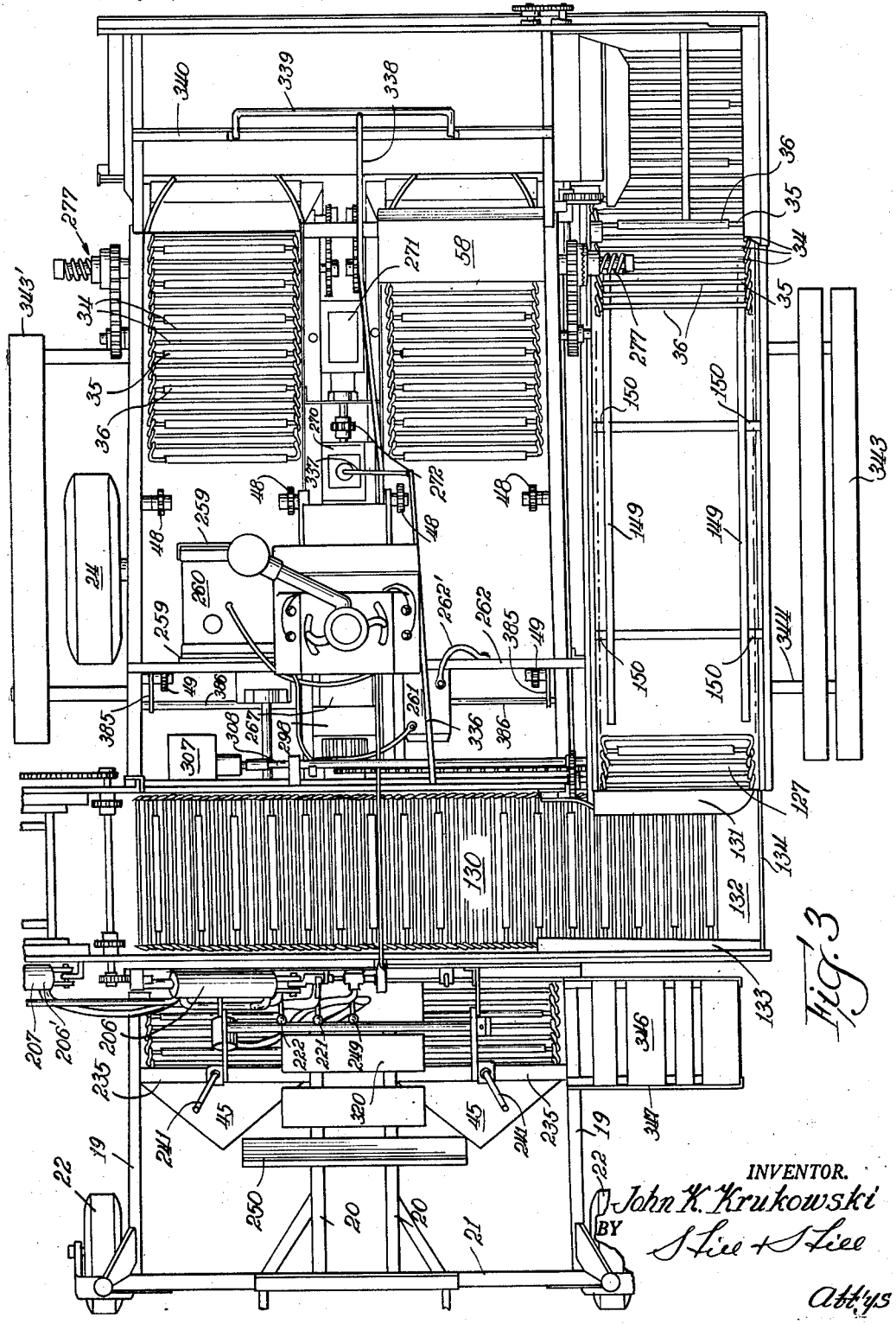

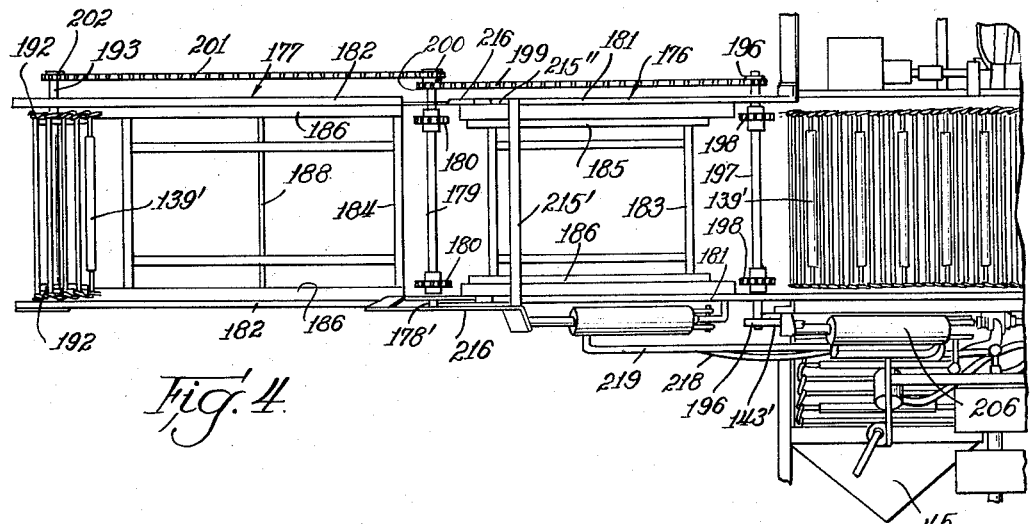
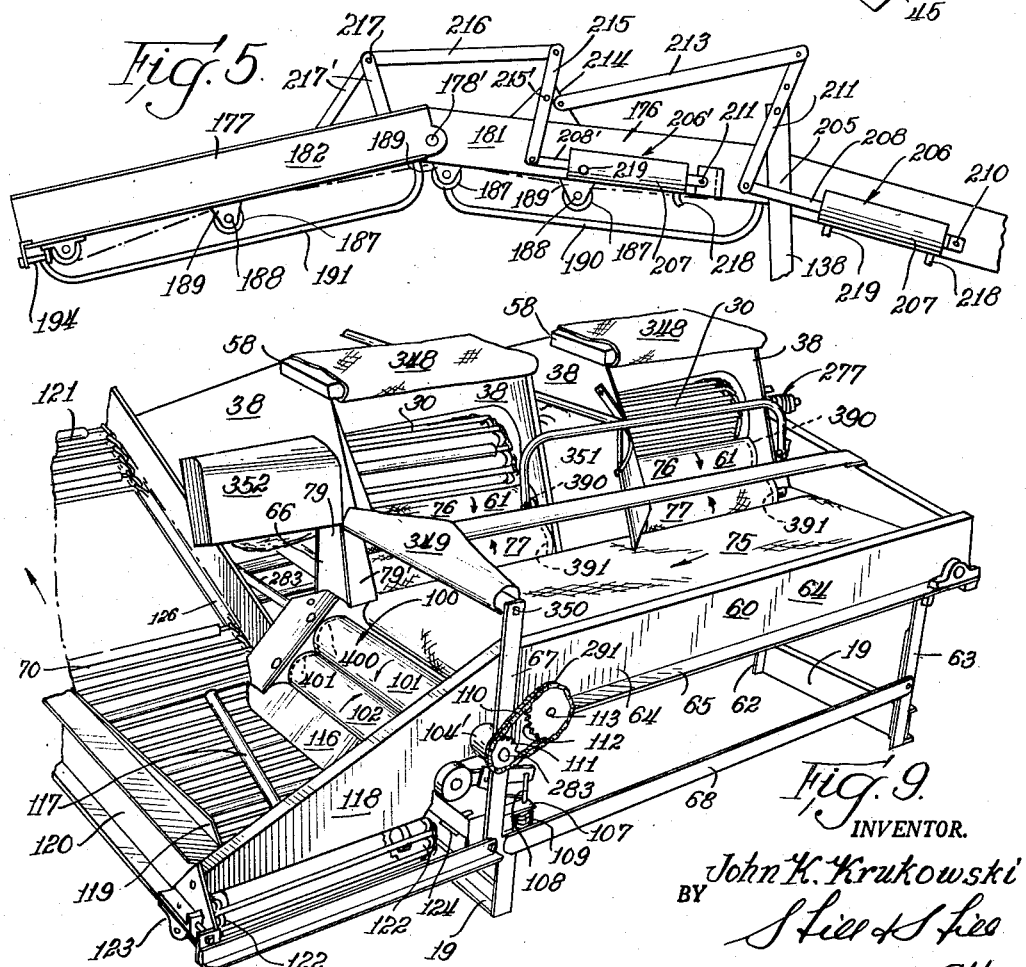

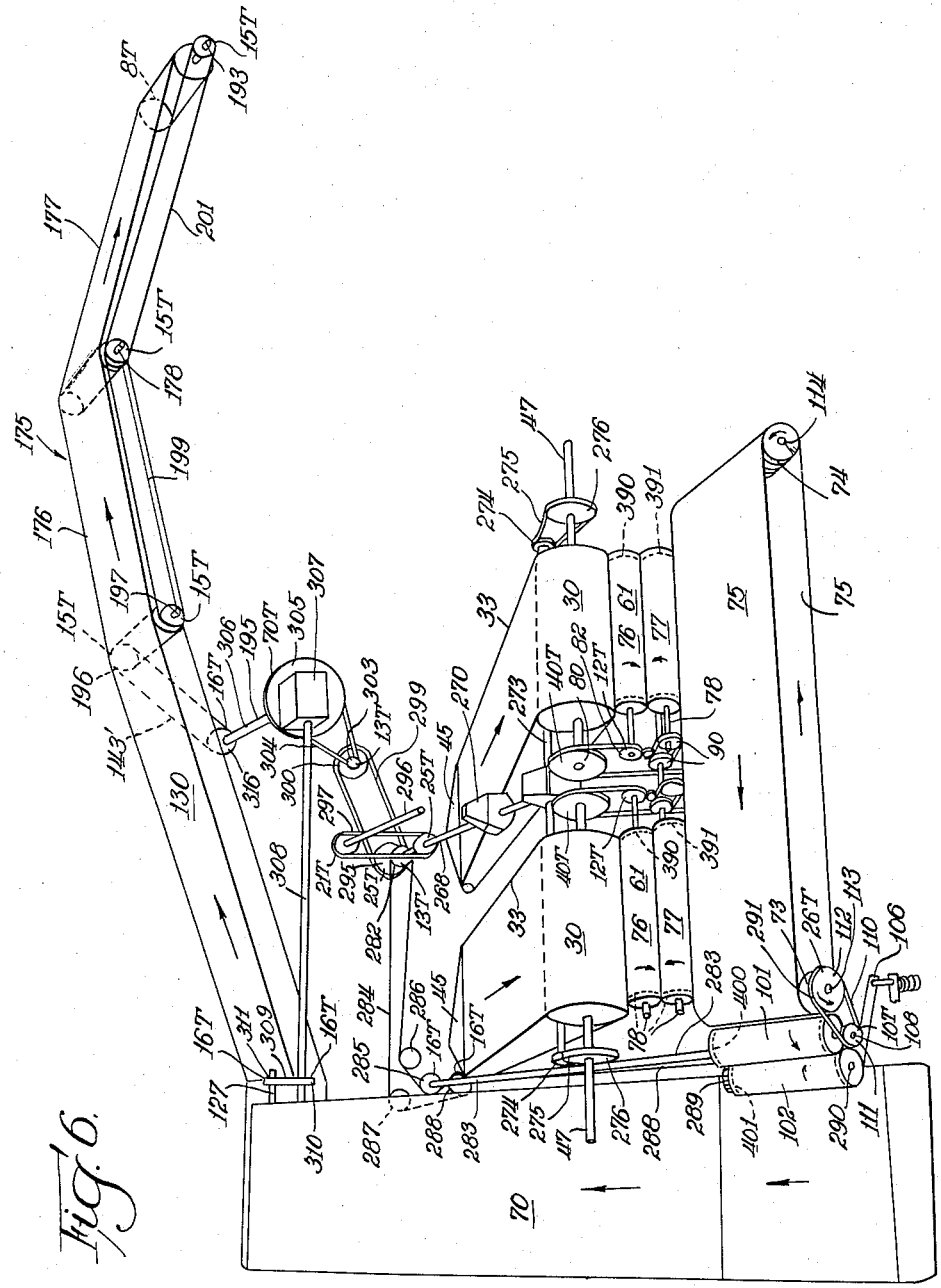

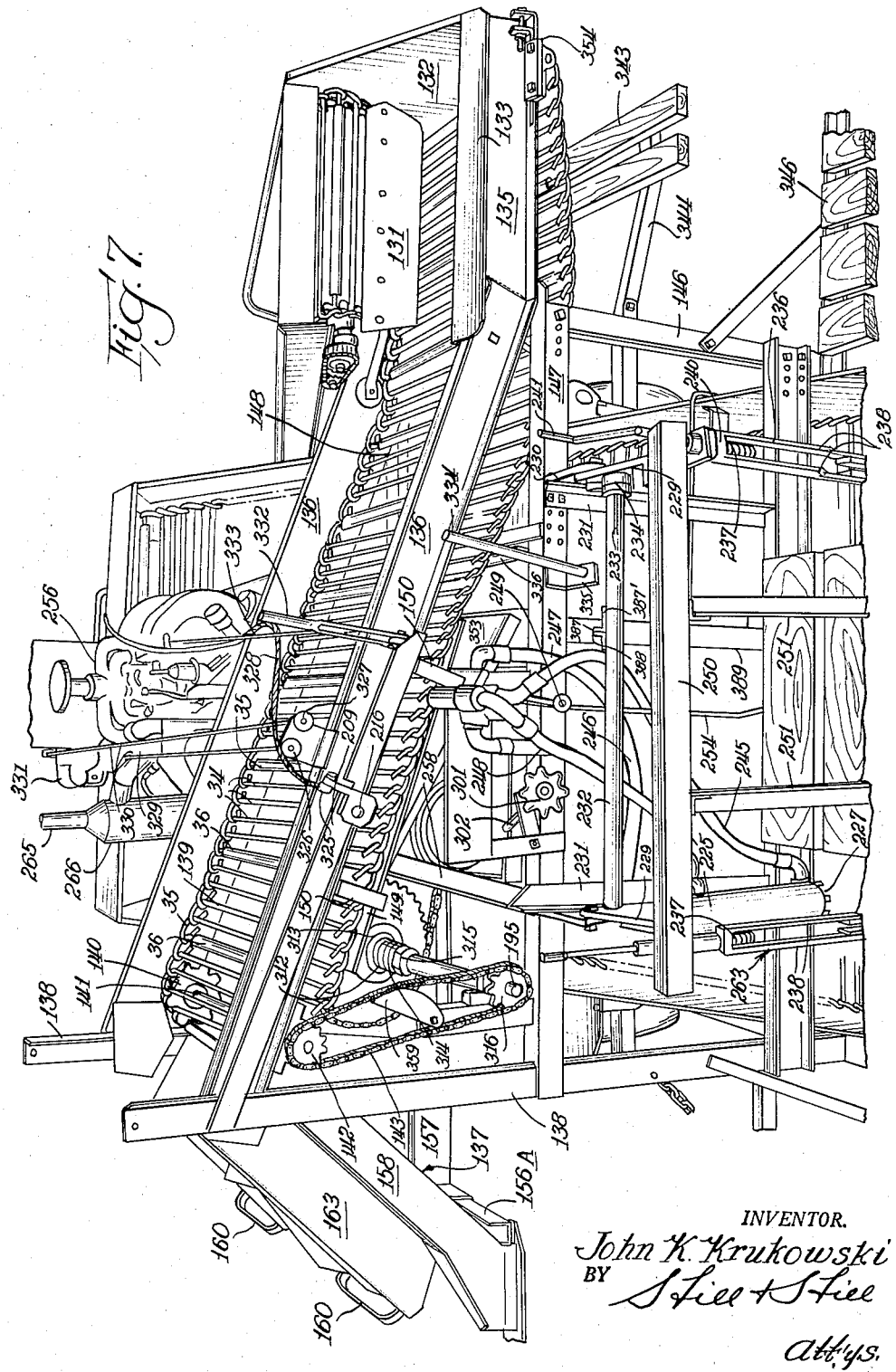

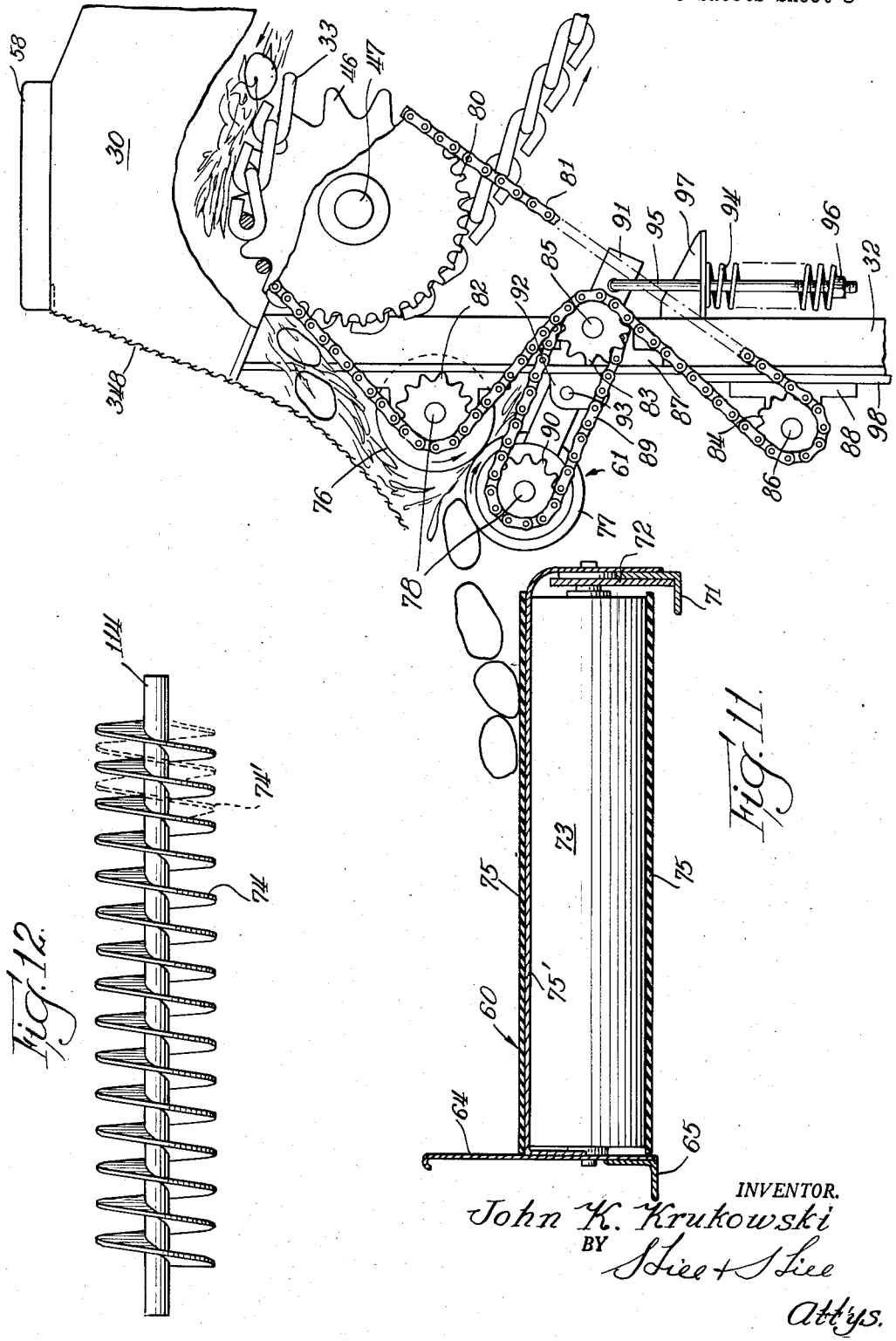

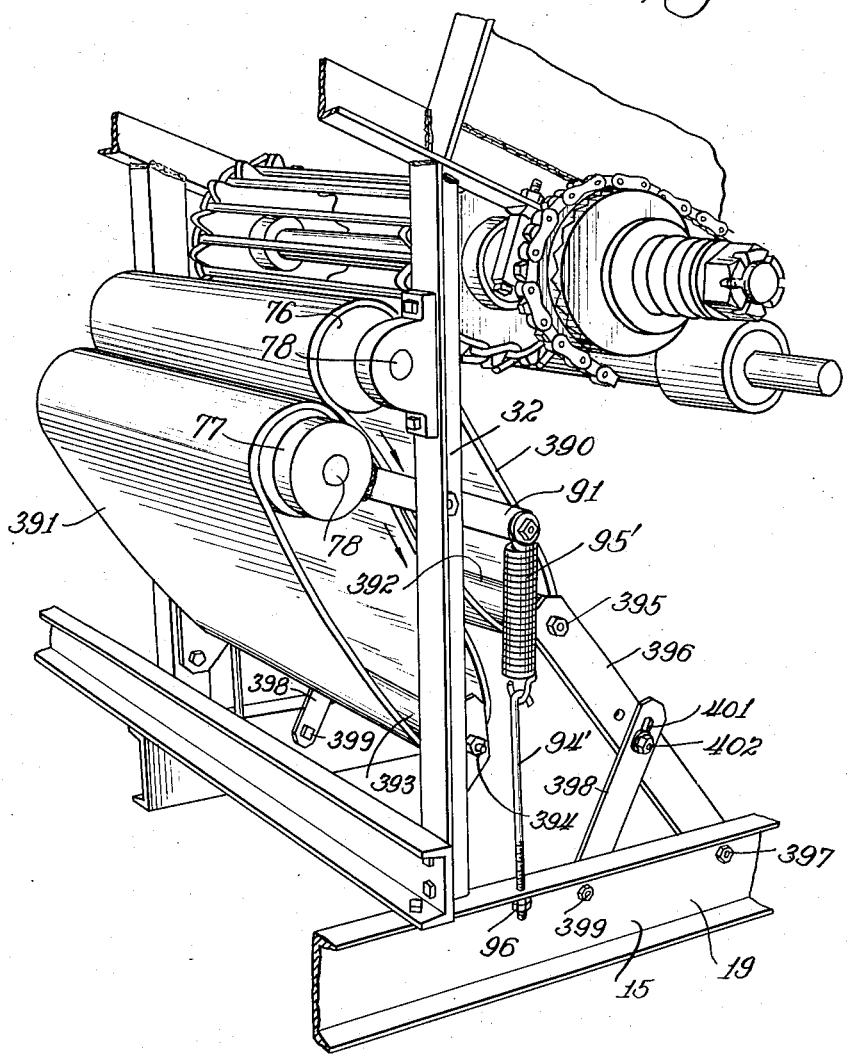

United States Patent Office 2,901,048
Patented Aug. 25, 1959

2,901,048

POTATO HARVESTER AND SEPARATING MEANS THEREFOR

John K. Krukowski, Hammond, Ind., assignor to Champion Corporation, Hammond, Ind., a corporation of Indiana Application July 6, 1953, Serial No. 369,464

36 Claims. (Cl. 171—28)

This invention relates to a potato harvester, and more particularly relates to a combination of several units arranged to provide a compact machine for digging potatoes, separating dirt and rocks, and removing the vines therefrom, and collecting or bagging the potatoes at a point remote from the digging unit.

Various forms of mechanical potato diggers and harvesters have been used for digging potatoes along with the dirt, and shaking the dirt from the potatoes on a conveying or shaking chain. Many have been horse-drawn and provided with additional motor power for actuating the conveying and shaking chain, and more recently have been tractor drawn with the power for the conveying elements from the power take-off of the tractor. In certain digging conditions, in addition to separating the dirt from the potatoes, it is necessary to separate the rocks if the potatoes are planted in a stony area, and likewise, when the frost has not had a chance to dry the vines, there is the additional problem of removing the vines, weeds, and similar materials from the potatoes, together with removing any rocks or large clods of dirt if the soil has become packed. Also, in digging the potatoes, it is essential to provide an elevator construction such that the potatoes are not bruised by the elevator, and that the capacity of the elevator is such that whether the yield of potatoes is large or small, the harvester may handle the potatoes under any conditions. Stones must also be separated without bruising the potatoes, and it is very essential where there is a large amount of vines, that the vines be removed to permit further sorting of any rocks or clods from the potatoes so that the potatoes may be delivered to the bagging station, or loaded within a truck or wagon drawn alongside the harvester in a relatively clean condition so that very little additional sorting is necessary during the grading operation as they are finally packed for shipment or storage.

The potato harvester of the present invention is so arranged that the machine will simultaneously dig one row, and a maximum of two rows if the digging conditions permit, and the harvester is normally tractor-drawn with the motor power for the elevating and conveying mechanism, and vine-stripping mechanism driven from an auxiliary engine mounted upon the harvester and provided with change speed mechanism so that the speed of the elevators and conveyors may be controlled at will by an operator, or located at a vantage point for observing the operation of the harvester. Certain operator stations are also provided at various vantage points contiguous to the digging elevators and the conveying elevators so that the operators may assist in sorting rocks, and the like, from the potatoes, and in one embodiment of the invention a bagging station is provided so that as the potatoes discharge from the conveyor, they may be bagged, while in another embodiment of the invention an adjustable conveyor is provided for discharging the cleaned potatoes directly to the wagon body or truck running alongside the tractor harvester unit.

It is therefore a principal object of the invention to provide an improved form of potato harvester which will simultaneously either dig and prepare for bagging, or dig and deliver to a moving storage bin such as a truck or wagon driven alongside the harvester the potatoes as they are dug by the harvester during movement of the harvester across the field as drawn by a tractor or the like of suitable power.

Another object of the invention is to provide a hydraulic means for adjusting the shovels of each of the digging units, and also manual means for varying the depth of digging in conjunction with the hydraulic means.

Still another object of the invention is to provide means for controlling the amount of agitation of the digging elevator.

Still another object of the invention is to provide a potato harvester which may be readily converted from a harvester which is adapted to bag the potatoes to one in which the potato harvester is adapted for delivering the potatoes to a storage bin of a vehicle driven alongside of the potato harvester in relatively close proximity thereto.

Still another object of the invention is to provide hydraulic actuated means for adjusting the transverse delivery elevator with respect to the vehicle driven alongside the potato harvester.

Still another object of the invention is to provide power means other than that of the tractor for imparting motion to the elevating and shaking conveyors, and to the conveyors of the sorting mechanism and discharge conveyors which may be controlled by a single operator as the operator controls the depth of digging, the adjusting of the speeds of the conveyor mechanism, and the elevating conveyors from a single station.

Still another object of the invention is to provide a simple change speed mechanism actuated by the power unit along with the simple hydraulic mechanism for actuating the hydraulic lifts for the digging mechanism and that of the elevating mechanism.

Still another object of the invention is to provide air cleaners for the intake air and the cooling air of the auxiliary engine.

Another object of the invention is to provide means for detaching the vines from the potatoes of each digging mechanism along with auxiliary de-vining mechanism for further removing any vines from the transverse conveyor which delivers the potatoes from each of the digging elevators to the sorting and conveying elevator.

Another object of the invention is to provide a simple arrangement of the multiple digging units to permit the transverse adjustment for different spacing of the rows of potatoes which are to be dug.

In accomplishing the various objects of the invention, a principal feature of the invention is providing spaced, longitudinally mounted digger units, each including a shaking and elevating conveyor which delivers vines and other trash along with the potatoes to a transverse conveyor, and between the digging units and the transverse conveyor is placed pinch rolls or de-vining means which serve as the de-vining mechanism for removing the vines from the potatoes, and likewise serve to detach any potatoes which still hang to the roots of the vines, and provide a chute for the delivery of the potatoes and any stones to the transverse conveyor.

Another feature of the invention is an elevating and sorting conveyor along which is mounted a sorting station for one or more operators for sorting any stones, rocks or other trash from the clean potatoes which are then transferred to a transverse conveyor which is adapted for either delivering the clean potatoes to a bagging station or to a truck or other vehicle drawn alongside the potato harvester.

Still another feature of the invention is to provide an additional set of pinch rolls at the ends of the transverse conveyor for further separating any vines from the potatoes before they are delivered to the elevating and sorting conveyor.

Another feature of the invention is to provide in the driving mechanism a transmission adapted for operating the digging and elevating units at various speeds, and which may also reverse the direction of travel of the shaking and conveying elevators, if necessary, to clear the elevators of any obstruction.

Still another feature of the invention is to provide an operator station at the front of the machine by which the depth of digging, the speed of the elevators and the adjusting of the elevators may be controlled, and included as another feature is simple mechanism for remotely controlling the auxiliary power from another operator station in case of emergency.

A further feature of the invention is to provide a power operated means preferably in the form of an auxiliary operated, automotive type, two cylinder engine which provides the necessary power for actuating the shaking and elevating conveyors, the transverse conveyor and the sorting and elevating conveyor means which are adapted for delivering the cleaned potatoes to a bagging station or to a vehicle driven alongside the potato harvester, and also furnishes the power for the de-vining apparatus positioned between the shaking and elevating conveyor and the transverse conveyor, and the power means also drives the de-vining apparatus located at the end of the transverse conveyor as it discharges upon the sorting and elevating conveyor means. This power means further includes a change speed mechanism wherein the speed of the shaking and elevating conveyors and the de-vining apparatus for these conveyors may be changed independently of the speed of operation of the transverse and sorting and elevating conveying means. The change speed mechanism is also provided with a reverse mechanism wherein the direction of travel of the shaking and elevating conveyors and the de-vining apparatus therefor may be reversed if necessary to remove any obstruction. The arrangement of the driving mechanism for the various conveyors also permits the shaking and elevating conveyor means, and the de-vining apparatus therefor, to be stopped as the transverse and sorting and elevating conveyor means are actuated to remove any excess material, including the potatoes being sorted, and thus prevent any clogging of the various conveyors in the event the digging conditions are such as to excessively load the various conveyors.

Another feature of the invention is the provision of a simple hydraulic apparatus which is adapted to be driven from the power means, and is adapted to provide hydraulic power for adjusting the transverse elevating means for adjusting the discharge end thereof with respect to the bin of the vehicle driven alongside the potato harvester.

Another feature of the invention is that the principal operator's station is located at the front of the potato harvester so that the operator may control the depth of digging, watch the operation of the various conveyors, control the operation of the auxiliary engine, and manipulate the change speed mechanism for the shaking and elevating conveyors from the various controls located conveniently to the operator's station.

Still another feature of the invention is to provide various platforms convenient to the various conveyors to aid in the sorting of the trash from the potatoes, and also to provide a simple bagging station so that the potatoes delivered from the transverse elevating conveyor may be readily sacked from a multiple bagging chute.

Still another feature of the invention is the provision of simple means for adjusting the spacing of the digging units to adjust for the different row spacing in the different areas where the potatoes are grown.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

Fig. 1 is a perspective view illustrating the right side of a potato harvester equipped with a bagging station to bag the clean potatoes directly on the harvester, and illustrating the shaking and elevating conveyors, the auxiliary means, and the hydraulic mechanism;

Fig. 2 is a side elevation of the left side of the machine when viewed in the direction in which the machine is being pulled, and illustrates the power lifting means for the digging units, the driving mechanism, the sorting and elevating conveyor, and the transverse conveyor along with the auxiliary engine;

Fig. 3 is a plan view of the potato harvester illustrating the arrangement of the digging units, the shaking and elevating conveyors, shown in part, to reveal other features of the potato harvester, the devining apparatus for the shaking and elevating conveyor, the transverse conveyor, the sorting and elevating conveyor, shown in part, to reveal other features of the potato harvester, the transverse elevating conveyor, the arrangement of the auxiliary power means, the hydraulic actuating means for the digger units, and the transverse conveyor means;

Fig. 4 is a top plan view of the extended portion of the transverse elevating conveyor of Fig. 3, and the hydraulic mechanism therefor;

Fig. 5 is a side elevational view of the structure illustrated in Fig. 4;

Fig. 6 is a schematic illustration of the arrangement of the various conveyors of the potato harvester illustrating the arrangement of the drive mechanism therefor, together with that of the devining apparatus for each of the shaking and elevating conveyors, and the transverse conveyor;

Fig. 7 is a perspective view illustrating the location of the various controls for the auxiliary power unit and the hydraulic control for the hydraulic lifting means for the digger units, and further illustrates the discharge of the transverse elevating conveyor to the delivery chute at the bagging station;

Fig. 8 is a perspective view of the front end of the potato harvester particularly illustrating the linkage connections for each of the different units, and also showing the arrangement for the lateral adjustment of the frame of the potato harvester to conform to the spacing of the rows being dug;

Fig. 9 is a perspective view illustrating the arrangement of the devining apparatus with respect to the discharge ends of the shaking and elevating conveyors as they discharge upon the transverse conveyors, and the location of the devining apparatus at the discharge end of the transverse conveyor as it discharges to the sorting and elevating conveyor;

Fig. 10 is an enlarged vertical elevation taken substantially along the center line of the transverse conveyor and illustrating, partly in section, the construction of the devining apparatus at the end of the transverse conveyor;

Fig. 11 is an enlarged view taken along line 11—11 of Fig. 10 illustrating the devining apparatus and the driving therefor, together with its relative location between the upper end of the shaking and elevating conveyor, and the transverse conveyor;

Fig. 12 is an enlarged view taken substantially along line 12—12 of Fig. 10, and illustrates the helical driven roll of the transverse conveyor to remove the dirt and trash collecting between the upper and lower uprights of the transverse conveyor; and Fig. 13 is a perspective view illustrating an improved devining mechanism for use with the devining rolls of the potato harvester of this invention, and illustrated in conjunction therewith in Figs. 6, 9, and 10.

In order to show the general arrangement of the parts forming the potato harvester, a brief description of the units making up the harvester will be given. In one embodiment of the invention the potato harvester preferably comprises a wheeled main frame adapted to be attached to a tractor, or other suitable source of traction, and upon the frame is mounted pivoted digger units to be adjusted at various depths depending upon the hills of potatoes, and each of these digger units preferably comprises a shaking and elevating conveyor which discharges the potato vines and trash over a devining apparatus wherein the greater portion of the vines and trash, such as weeds, are discharged to the ground, and the potatoes, clods of earth and stones are then discharged to a transverse conveyor extending across the two digger units which, in turn, discharges any additional vines and weeds remaining through another devining apparatus to the ground, after which the potatoes, stones, etc., are discharged to a sorting and elevating conveyor. Operator stations are arranged at the upper ends of the digger unit and also along the side of the sorting and elevating conveyor. These operators can sort the stones and clods from the potatoes, and the elevator permits any remaining dirt to discharge to the ground from the sorting and elevating conveyor. The clean potatoes are delivered to a transverse elevating conveyor which delivers the clean potatoes to a delivery chute of a bagging station wherein the potatoes are bagged by an operator located on a platform contiguous to the bagging station. The various conveyors and de-vining apparatus are actuated from a power means, such as an auxiliary gasoline motor, and the motor in turn actuates the shaking and elevating conveyors, and the de-vining apparatus therefor, through a change speed mechanism which has several changes of speed and a reverse gear so that the speed of the shaking and elevating conveyors may be operated in accordance with the field conditions. An operator station is also provided forward of the transverse elevator, with the various hydraulic controls for the shovels of the digger unit, the controls for the conveyors, and the motor located within conveinent reach of the operator.

In the other embodiment of this invention, the potato harvester is adapted to have the bagging station, including the delivery chute therefor detached, and adjustable extension elevators adapted to be mounted in alignment with the transverse elevator conveyor for delivering the cleaned potatoes to a vehicle driven alongside of the potato harvester. The arrangement of the other parts and the operation are similar, with the exception that additional hydraulic controls, including adjusting cylinders, are provided for adjusting the extensions of the transverse elevator conveyor with respect to the vehicle being loaded. In each instance, conventional forms of auxiliary gasoline engines are used, together with a conventional form of gear shift, a hydraulic tank, and pump cylinders for the lifting device for the digging units, and for the adjusting mechanism of the adjustable sections of the transverse elevator conveyor. With respect to these standard commercial devices, the particular novelty with respect to the present invention is in the arrangement of the structures relative to the arrangement of the various conveyors and lifting devices which they actuate.

Referring to Figs. 1 and 2, the arrangement of the structure of the potato harvester adapted for bagging the clean potatoes directly upon the harvester will be described. A wheeled frame 15, including the rear wheels and front casters, is adapted to be drawn from a draw bar 16 of a tractor through a draw bar 17 pivotally mounted upon the frame. Referring to Figs. 1 and 2 the draw bar 17 is pivotally attached to connections 18. The main frame 15 comprises longitudinally extending frame members 19 and central frame members 20 which are connected with an adjustable transverse frame member 21. Caster wheels 22 are mounted on brackets 23 at the corners of the main frame, and rear wheels 24 are journaled upon suitable axle brackets 25 affixed to an intermediate frame member 26 to which the frame members 19 and 20 are welded, or otherwise affixed, as illustrated in Fig. 10.

Digging units 30 are mounted on the main frame by vertical support members 31 and 32 to incline the digging units at a suitable angle for elevating and shaking the earth, trash and potatoes as the harvester is pulled along the rows being dug. The digging units 30 preferably comprise elevating and shaking conveyors 33 made up of detachable links 34 and 35 wherein the links 34 extend downwardly, the links 35 having an intermediate portion which extends upwardly, and having a rubber coated portion 36. The links 34 and 35, as shown in Fig. 3, provide a basket-like receptacle to receive the potatoes as they are elevated, and prevent them from rolling back down the conveyor as the conveyor chain is agitated.

Each digger unit 30 comprises right and left hand side frame members 37 to which are attached the side sheets 38. The lower end of each of the digging units comprises a pivoted section 40 having side sheets 41 mounted on angle frame members 42. The pivoted sections 40 are pivoted at 43 to a bracket 44 affixed to the side frames 37 of the upper sections of the digger units. A digging shovel 45 is detachably mounted to a suitable cross-bar (not shown) of the lower section of each digging unit.

Each of the conveyor chains 33 is operatively mounted at their upper ends upon sprockets 46 affixed to a transverse shaft 47, suitably journaled in bearings mounted at the upper end of the digger units, and the upper flights of each conveyor chain extends over suitable supporting rollers 48, and also, when necessary, over elliptical-shaped, agitating sprockets 49 for vertically agitating the conveyor. As shown in Fig. 2, the lower flight of the conveyor is mounted upon rollers 48 to prevent the conveyor chain from dragging upon the ground. It is well understood in the art that under certain digging conditions it may only be necessary to use the rollers 48, and in extreme digging conditions, it may be necessary to add additional agitating sprockets 49, Fig. 2 and Fig. 3, and as also illustrated in the prior art, Wright et al., 1,715,218, granted May 28, 1929.

The digging units as used in the construction of this potato harvester are what is known as a twenty-two inch digger unit, which means that the conveyor link has an overall width of twenty-two inches. Each of these links preferably are fabricated from steel, which may be heat treated to give additional strength and wear, and are adapted to be detached for adding additional links, or for repair. The digging units are preferably spaced for digging thirty inch rows, but may be laterally adjusted by the adjustable transverse frame member 21, Fig. 8. This adjustable frame member comprises a short channel member 52 adapted to be adjustably connected to the right and left hand members 53 and 54 of the adjusting member 21. An upper angle member 55 is adapted to be detachably connected to the legs of the channel-shaped members 53 and 54. Another angle member 56 is further affixed to the member 55 to provide a support for a bearing (not shown) for a drive from the power take-off of the tractor when the auxiliary engine is not used. At the upper end of each of the digging units 30 are mounted sheet metal transverse members 58 affixed to side sheets 38 of each of the units and in certain conditions may be used as seats, (one of which is removed) Fig. 1, Fig. 9, and Fig. 10. These seats additionally brace the side sheets of the digging unit, and provide operator stations for operators to remove excess trash, and to watch the operation of the digging units.

Referring to Figs. 1, 2, 3, and 9 through 13, a transfer conveying structure 60 is provided for receiving excess dirt, the potatoes, and excess trash discharged from each of the digger units 30 and over the respective devining apparatus 61 of the digging units. The transverse conveyor unit is supported on the main frame by vertical supporting brackets 62 and 63 welded or otherwise affixed to the channel-shaped frame members 19. The transverse conveyor construction includes a rear sheet member 64 affixed to a transverse angle 65, Figs. 9 and 11. The left side of the transverse conveyor structure is suitably supported by frame members 66 and 67 suitably affixed to the left channel member 19, and positioned to support the conveyor. A transversely extending frame member 68 extends across the entire length of the transverse conveyor and additionally supports the frame structure of the sorting and elevating conveyor 70. Referring to Fig. 11, the front frame construction of the transfer conveyor comprises a transverse angle 71 and bearing brackets 72 for suitably journaling a drive pulley 73 and a helically formed driven pulley 74, Fig. 12. A conveyor belt 75 extends around the pulleys 73 and 74, and is supported by a sheet metal, substantially U-shaped structure 75′, Fig. 11, affixed at the front end to the angle 71, and at the rear end to the member 64.

Referring to Figs. 6, and 9 through 12, the devining apparatus for each of the digging units 30 will be described, particularly with respect to the location thereof at the discharge end of each digging unit and the transverse conveyor 60. The devining apparatus 61 comprises an upper roll 76, and a lower roll 77 operatively mounted on transverse shafts 78 journaled in bearings 79 supported on frame members 79′ affixed to the frame structure of each of the digging unit 30 so that the plane of the axes of the shafts is inclined downwardly and rearwardly to discharge the material from the digging unit upon the transverse conveyor 60. The rolls 76 and 77 comprise a covering of soft, resilient rubber, preventing bruising of the potatoes as they pass over the rolls, and also permitting the rolls to be biased together to act as pinching rolls to grasp vines, weeds, and the like, and discharge this material between the rolls to the ground underneath the harvester, and over the previously dug rows. In order to accomplish this, the rolls 76 and 77 are driven inwardly in the same direction at their line of contact, as shown by the arrows, Fig. 11. This motion of the rolls serves to devine any potatoes still adhering to the roots of the vines. After the potatoes have been devined, they travel under the action of gravity and the motion of the rolls to discharge upon the conveyor belt 75, as schematically illustrated.

Referring to Figs. 10 and 11, each of the devining apparatus is driven from a sprocket 80 mounted on the shaft 47 by a chain drive 81 operatively mounted over the sprockets 82, 83, and 84. The sprocket 82 is mounted on the upper shaft 78, and the sprockets 83 and 84 are mounted on shafts 85 and 86 journaled in bearings 87 and 88 operatively mounted on the inner vertical supports 32. The lower roller 77 is driven from the shaft 85 by a chain drive 89 extending over similar sprockets 90 operatively mounted on the shafts 78 and 85. The lower shaft 78 is operatively mounted on an arm 91 pivoted on a bracket 92 at a pivot point 93. The bracket 92 is mounted on the upright 32. The arm 91 is spring-biased by spring-biasing means comprising a spring 94 mounted on a rod 95 operatively connected to the arm 91 at its upper end, and provided with an adjusting nut 96 at its threaded, lower end. The spring is held between a support bracket 97 affixed to the upright 32, and the rod 95 extends therethrough, permitting the spring to abut against the lower face of the bracket. By adjusting the compression of the spring, the pressure with which the lower roll 77 contacts the upper roll 76 may be adjusted to the working conditions to permit the proper separation of the vines from the material passing over the devining apparatus. In order to adjust the tension of the chain 81 driving the upper roll 76, a supporting bracket 98 is mounted on upright 32 to which the bearings 88 are adjustably mounted. Adjustment is provided by moving the bearings 88 vertically on the bracket 98 which is provided with slotted holes (not shown) to permit the adjustment.

The devining apparatus 100, Fig. 10, similar to the devining apparatus 61 operatively mounted at the discharge end of each of the shaking and elevating conveyors, is operatively mounted at the discharge end of the transverse conveyors 60, and comprises an upper roll 101, and a lower roll 102, each having a resilient rubber covering 103 similar to those of the devining apparatus 61. Each roll is operatively mounted on shafts 104 and 105 so that the plane of the axes of the shafts is inclined downwardly from the discharge end of the conveyor belt 75 to the sorting and elevating conveyor 70. The shafts 104 are journaled in bearings 104′ operatively supported on the supports 67, and the lower shaft 105 is journaled on arms 106 pivoted on brackets 107 affixed to the upright 67. The arms 106 are spring-biased by biasing means comprising rod 108 extending through the bracket 107, against which a spring 109 mounted on the rod is affixed by a nut 96 adjustably mounted on the threaded end of the rod 108. The adjusting mechanism for the lower roll 102 is similar to the adjusting mechanism of the lower roll 77 of the devining apparatus 61 mounted at the end of the shaking and elevating conveyors. The adjustment of the roll 102 permits the lower roll to be biased against the upper roll to resiliently grip any remaining vines or weeds for discharge to the ground between the rolls as the rolls rotate in the direction of the arrows, Fig. 10.

Although the devining apparatus 61 for each of the digging units and the transverse conveyor and its devining apparatus are a unitary part of the potato harvester, it is within the scope of the invention that the devining apparatus are adapted to be mounted on a single digger unit or a two-row digger, and likewise, it is to be considered that the transverse conveyor and its devining apparatus may also be operatively mounted upon a conventional two-row digger unit. The conveyor belt 75 is driven from the shaft 104 by a chain drive 110 over sprockets 111 and 112, and the driven sprocket 112 drives the shaft 113 for driving the pulley 73 which rotates the conveyor belt. The driven pulley 74, as previously described, is helical in shape, and supported on the shaft 114, and as the belt is operated, any dirt and trash which collects on the lower part of the conveyor belt is discharged to the rear edge of the belt. Although it is within the scope of the invention that the helical conveyor 74 may be coiled in the reverse direction from that shown in Fig. 12 to discharge the dirt and trash which may collect forwardly of the conveyor belt, if desired, it is within the scope of the invention that one-half of the helical conveyor pulley may be coiled in one direction, and the other end in the opposite direction to discharge any material toward each outer end of the pulley. This construction of the pulley 74 prevents the dirt from building up upon the peripheral surface if a conventional form of crown pulley is used.

To prevent the potatoes from bruising as they are discharged over the surfaces of the rolls 101 and 102, a rubber-covered chute 116 is provided substantially tangential to the lower roll 102, Figs. 9 and 10, to ease the fall of the potatoes, and a tubular rubber member 117, Fig. 9, is affixed to the end panel 118 of the transverse conveyor apparatus 60 to further check the fall of the potatoes along with a rubber shield 119 mounted on a lower side panel 120 of the sorting and elevating conveyor 70. It is thus evident that a simple resilient construction, comprising the rubber-covered rolls of the devining apparatus 100, the rubber-covered chute 116, the rod 117, and the shield 119, forms simple means for reducing the bruising of the potatoes as they are discharged from the upper flight of the transverse conveyor to the conveyor chain 121 of the sorting and elevating conveyor.

Referring to Figs. 2, 3, 6, 7, and 9, the sorting and elevating conveyor mechanism 70 will be more fully described. The conveyor chain 121 is made up of similar chain links 34 and 35 to the chain of the digging units, but are preferably assembled to provide larger shaped pockets than those formed on the shaking and elevating chains. It is preferred to have at least four links 34 to provide the bottom portion of the pockets, the edges of the pockets being formed by the rubber-covered, upwardly extending links 35. The rubber covering 36 of the raised portion of the links prevent any additional bruising of the potatoes as they are discharged from the transverse conveyor belt 75 upon the lower end of the sorting and elevating conveyor. The lower end of the conveyor chain 121 is supported on sprockets 122, which are operatively mounted on a transverse shaft supported upon brackets 123 and 124 mounted on the side frames of the sorting and elevating conveyor. The sorting and elevating conveyor is formed by upwardly extending frame members 125 formed as shown and support guide bars 126 for the edges of the upper upright of the links forming the conveyor chain 121. The upper end of the conveyor chain 121 is supported on sprockets similar to the lower sprockets 122, and operatively connected to a drive shaft 127 supported on bearings 128. The clean potatoes are discharged from the upper end of the conveyor chain 121 to a transverse elevator conveyor 130 over a rubber-covered chute 131 to reduce the fall of the potatoes upon the transverse elevator conveyor, and are further shielded to prevent bruising by rubber shields 132 and 133, Fig. 3. The shield 132 is supported on the end panel 134, and the shield 133 is supported on the lower panel 135 of the transverse elevator conveyor 130.

The transverse conveyor elevator 130 preferably shall extend upwardly and laterally to discharge to the chute 137 of the bagging station A. The upper end of the transverse conveyor elevator 130 and the discharge chute 137 are supported upon upright frame members 138. The frame members 138 are suitably braced by cross frame members, not shown, and are provided with spaced, hardwood strips, described more particularly later, to provide a support for the conveyor chain 139, and to prevent unnecessary wear of the links. At the lower end the conveyor chain 139 is supported upon sprockets (not shown), and the chain at its upper end extends over drive sprockets 140 mounted on a shaft 141, the shaft being driven by a sprocket 142 through the drive chain 143. The particular relationship of the drives for the various conveyors will be later described with reference to Fig. 6 with the description of the operation of the apparatus. The conveyor elevator 139 is similarly constructed as the sorting and elevator conveyor 121, and is provided with pockets provided by the links 34 and 35, as illustrated in Fig. 7. The sorting and conveying elevator 70 and the transverse conveyor 130 are additionally supported upon the main frame by upright supports 145, 146, and the transverse frame members 147 and 148, Figs. 2 and 7. To further support the lower flight of the elevators 121 and 139, similarly formed depending supports 149 are mounted on opposite sides of the frames of the elevators, and suspended by brackets 150. Wherever necessary, suitable rollers (not shown) may be positioned along the conveyor to additionally support the conveyor chain.

Referring to Figs. 1 and 7, the supports for the bags at the bagging station will be described with particular reference to the loading of two bags or sacks simultaneously, the bagging station permitting additional bags to be positioned on the discharge chute so that as the first pair of bags is filled, the other sacks may then be filled and new sacks positioned in place of those already filled. The bag station A is mounted to receive the clean potatoes discharged from the upper end of the transverse elevator conveyor 139, and comprises a downwardly inclined chute 155 suitably supported upon the upright 138 by a transverse frame 156 supported from the uprights by braces 157. Downwardly and outwardly divergent side shields 158 are affixed to the uprights 138 and the chute 155 to permit four similar bag supports 159 to be mounted at the bottom of the chute. The bag frames are substantially square to mount the bag opening thereon, and clamps 160 permit the bags to be readily attached and detached to their respective frames. In the dotted lines of Fig. 1, bags 161 are shown about to be clamped to the alternate bag frames 159. Referring to Fig. 1, the pivoted guides 162 and 163 are shown in position for delivery of potatoes to bag frames X and Y, which have the bags removed to illustrate the hydraulic mechanism. The dotted position of the guides 162 and 163 permit delivery of the clean potatoes to the sacks 161. A center guide 164 divides the delivery chute 155 in half. A platform 165 for supporting the sacked potatoes is pivotally mounted on the uprights 138, and chains 166 limit the downward movement of the platform. The platform shown in Fig. 1 is located to support the filled sacks of potatoes, and when not in use, the platform may be folded upwardly alongside the frame members 138, and secured in position. A platform 167 is suitably supported on frame members 168, and braced by a diagonal brace 169 affixed to one of the frame members 138 to support the operators who attend to the sacking of the potatoes, and the mounting of the sacks on the bag holders 159. Suitable supports 170 and 171 for empty bags, are mounted contiguous to the bagging station, and are supported upon brackets 172 affixed to the main frame, and a bracket 173 mounted on the right digger frame 30.

Referring particularly to Figs. 3, 4, 5, and 6, the extension loader will be described which permits conversion of the potato harvester in which the potatoes are sacked directly on the machine to a potato harvester wherein the cleaned potatoes are loaded directly into a vehicle driven alongside the potato harvester. The extension loader 175, Figs. 3, 4, 5, and 6, is made up of hinged frames 176 and 177, hinged together at 178, and provides the bearing support for a transverse shaft 179, upon which are mounted sprockets 180 to support the extended conveyor chain 139'. Each of the hinged frames 176, 177 are formed by right and left hand side sheets 181 and 182 for the respective conveyor frames. Rectangular shaped frame members 183 and 184 are formed from transverse and longitudinally extending pipe members welded together and affixed to the respective side sheets 181 and 182 to provide a rigid frame construction, and longitudinally extending hardwood strips or guide members 185 and 186 are supported on the frames 183 and 184 to provide a wear surface for the upper flight of the conveyor extension 139'. To additionally support the lower flight of the conveyor on the outer frame, rollers 187 are suitably mounted on a transverse shaft 188 suitably journaled in bearings supported by brackets 189. The inner frame 176 may be similarly provided with a support for the lower part of the conveyor and, in addition, a similar support for the chain is provided contiguous to the pivoted hinge connection at 178. To add additional strength to the frames, and as a guard against accident, longitudinally extending members 190 and 191 are affixed to the frames of the conveyor extension on each side. The extended conveyor 139' is driven from its outer end by sprockets 192 operatively mounted on a drive shaft 193 suitably journaled in bearings mounted on the outer ends of the extension frame 179, and the chain may be tightened through a suitable chain tightener 194 at each end of the frame for shifting the shaft longitudinally with respect to the frame.

The drive for the extension sections of the loading elevator is operated from the shaft 195 through a chain drive 143', Fig. 6, similar to the chain drive 143, Fig. 7, of the conveyor elevator 139 operatively connected to a driven sprocket 196 of the transverse shaft 197 which, in turn, has the sprockets 198 mounted thereon for intermittently supporting the conveyor 139' which extends thereover. A similar sprocket 196 on the opposite end of the shaft drives chain 199 operatively connected to a sprocket 200 on the shaft 179, Fig. 4. A similar sprocket 200, contiguously mounted drives the chain 201 which rotates the shaft 193 through a sprocket 202. The shaft 197, and its attached sprockets, is similar to the shaft 141, and its attached sprockets 140 and 142, Fig. 7. In the embodiment of the extension loader, the shaft, and its associated sprocket, is located as illustrated in Fig. 4 rather than as illustrated and described with the harvester having the sacking attachment as illustrated and described with reference to Figs. 1 and 7.

In order to provide vertical adjustment of the extensions 176 and 177 depending upon the height of the vehicle drawn alongside the potato harvester, a simple hydraulic adjusting means has been provided with respect to each extension elevator so that the extension elevator 175 may be adjusted with respect to the transverse elevator conveyor 139 and the harvester as it is pivotally connected upon the upright supports 138. A similar hydraulic adjusting means is provided for adjusting the outer extension 177 angularly with respect to the section 176. In assembling the extension to the main frame uprights 138, the extensions 176 and 177 are first pivotally assembled together for mounting upon the upright frame, and brackets 205 are adapted to be detachably mounted upon the uprights 138, and also provide support for the bearings of the shaft 197, and permit arcuate adjustment of the extension harvester section 177 about the axis of the shaft 197. A hydraulic actuating means 206 comprising a cylinder 207 and its associated piston and rod 208, is pivotally mounted on a support bracket 209, Fig. 7, at its pivotal connection 210. The piston rod 208 is pivotally connected to the lower end of a lever arm 211, which is pivoted to the front frame support 138, Fig. 5. A similar arm pivotally connected to the opposite upright 138 and transverse braces (not shown) connects these arms together so that the arms are simultaneously oscillated with to-and-fro movement upon the movement of the piston 205. Links 213 are pivotally connected to the upper ends of the arms 211, and to a support 214 affixed to the opposite side sheets 181 of the extension elevator 176. Referring to Fig. 5, as the shaft 205 is moved to the left under the action of fluid under pressure, the extension elevator 176 is raised vertically with respect to the uprights 138, and the associated frame 136 of the conveyor 130. The movement is such that the elevator extension 176 may be moved substantially in alignment with the elevator frame 136. Upon movement of the piston rod 205 to the right, the extension elevator 176 is tilted downwardly within a predetermined range of movement.

A similar hydraulic actuating means 206' for the actuation of the outer extension elevator 177 is operatively mounted on the extension elevator frame 176, and is pivoted at 211, and its piston rod 208' is pivotally connected to a lever arm 215 of a rock shaft 215'. The rock shaft 215' extends across the frame 176 and is connected to a lever arm 215". The U-shaped rock shaft provided by the rock shaft 215' and the associated arms 215 and 215" are connected by links 216 to a pivoted connection 217 formed by the bracket members 217' affixed to the side sheets 182 of the outer extension elevator 177. Since a pivoted connection 178' is provided between the extension elevators 176 and 177, movement of the piston shaft 208' to the left rotates the extension elevator 177 upwardly within a predetermined arc, and in its maximum position, will align itself with the extension elevator section 176. As the piston shaft 208' is moved to the right, the extension elevator section 177 is lowered as desired, so that the potatoes, as they are loaded in the vehicle alongside the harvester, will fall through as short a distance as possible to prevent excessive bruising.

Referring to Figs. 3, 4, and 5, the conduits 218 and 219 for each of the hydraulic actuating means 207 are operatively connected to the tank 220, Fig. 1, of the hydraulic actuating means and, in turn, are suitably connected to their respective actuating valves 221 and 222, Fig. 3. The valve 221 controls the fluid to the piston 206 for actuating the extension elevator 176 by admitting fluid either to one side or the other of the piston operatively mounted within its cylinder 207 through the conduits 218 and 219. Similarly, the valve 222 controls the admission of the fluid to either side of the piston to the cylinder of the hydraulic actuating means 206' for adjusting the extension elevator 177 through its conduits 218 and 219. Therefore, by movement of the valves 221 and 222 in their respective control positions, the extension elevators 176 and 177 may be simultaneously or independently adjusted within the range of movement of these extension elevators, as desired.

In order to adjust the depth of the shovels 45 of each of the digging units, a simple hydraulic adjusting means 225 is provided, and comprises a hydraulic cylinder 226 pivotally mounted at 227 to a transverse member 228 of the main frame, Figs. 1 and 2. At the upper end, the cylinder 226 is pivotally mounted to a pivoted frame 229 operatively mounted on forwardly extending brackets 230 affixed to the transverse frame member 147, and also supported by vertical, annular frame members 231 extending between the transverse frame members 147 and 228. A transverse shaft 232 extends between the pivoted arms 229. The shaft 232 is provided with a keyway 233 at one end for adjusting the right hand bracket, Fig. 7, upon changing the spacing of the digging unit. As illustrated in Fig. 7, the transverse shaft 232 is adjusted for the maximum row spacing.

Individual vertical adjustment of each of the digging units is provided through similar adjusting means, Figs. 2 and 7, U-shaped members 235, Fig. 8, are connected to the forward ends of the side sheets 41 of the pivoted digging units 40, which are pivoted about the connection 43 to the bracket 44 mounted on the main frame. Adjusting links 236 are pivotally connected between the U-shaped member 235 at their lower ends, and to an adjusting screw 237 at their upper ends. The adjusting link 236 is formed of upper links 238 and lower links 239. The adjusting screw 237 is adjustably threaded in a nut 240 mounted between the upper ends of links 238. An operating handle 241 is affixed to the upper end of the adjusting screw 237, and a rotatable joint is provided between the shaft of the adjusting screw 237 and the support bracket 242 at the end of the arm 229. As the handle 241 is rotated in either direction, the adjusting link 236 is raised or lowered about the adjusting screw 237 by means of the adjusting nut 240. Each of the digger units may be adjusted relatively with respect to one another by adjusting the position of the links 239 with respect to the bottom ends of the links 238, suitable adjusting holes (not shown) being provided for the securing means. Conduits 245 and 246 connect the hydraulic actuating means 220 to discharge fluid to the bottom and upper sides of the piston within the cylinder 226. Conduits 247 and 248 connect the tank 220 of the operating means to the control valve 249, Figs. 3 and 7. As the control valve 249 is actuated for directing fluid to the lower or upper side of the piston, the shovels are raised or lowered within predetermined limits simultaneously. It is possible to adjust each of the shovels of the digging unit with respect to the hydraulic lifting mechanism by operating the control handle 241 at each of the adjusting links 236. An operator's seat 250 is provided forward of the controls between the control handles, and supported by uprights 251 affixed to the outer ends of a transverse member 252, Fig. 8, connected to the center frame members 20. In order to provide a safety connection to prevent the digging units being raised above a maximum height, a linkage extends up to the control lever 249, and is actuated as the link 254 is tripped by the right digger frame 40 contacting a pivoted link 255.

Referring to Figs. 1, 2, 3, 6, and 7, the arrangement of the power means for actuating the various conveyors and the hydraulic actuating means will be described. The power means is furnished by a twin V-4, 24 H.P. motor 256, which is suitably supported upon a framework 257 mounted upon longitudinally extending frame members 258, and front and rear cross frame members 259. The front and rear cross frame members 259 support a gas tank 260, and a battery 261 is also suitably supported by suitable supports mounted on a transverse support 262, the battery being grounded thereto by a ground connection 262'. The engine is provided with a fan for air cooling, and an air inlet stack 263 extends upwardly above the engine so that the inlet 264 admits clean air above the usual dust level encountered in dry digging. An air intake 265 for the motor also extends to a suitable height above the motor, the air being drawn through a filter 266 for cleaning the air before it is led to the carburetor. At its front end, the motor is connected through a transmission 267 to a drive shaft 268, including a universal joint 269. The shaft 268 is operatively connected to a change speed transmission 270 having three forward speeds, and two reverse gears. The transmission 268 is directly coupled to a gear drive 271 through a coupling 272.

The drive for the digger units is actuated through beveled gear within the gear box 271, and the thirty-four tooth ring gear drives a transverse shaft 273 suitably journaled in a transversely extending housing, and the housing is clamped to the side frames of the digger units at their upper ends. A fourteen tooth sprocket 274 is operatively mounted on each end of the drive shaft 273, and connected through a chain drive 275 to a sixteen tooth sprocket 276, and each of the sprockets 276, in turn, operatively drives the shafts 47 upon which are mounted all the sprockets 46, Fig. 12, for supporting the conveyor chain 33 of each digger unit. A slip clutch 277, Fig. 10, is operatively mounted on the end of each shaft 47, and comprises a ratchet slip clutch 278 operatively connected to the sprocket 276 and shaft 47. The spring pressure upon the clutch is adjusted through a spring 279 and an adjusting nut 280, and the nut is adjusted with respect to a pin 281 operatively connected to the shaft. The slip clutches 277 slip if either of the elevators 33 become clogged by a rock, or other obstruction, caught between the shovel and the elevator.

As previously described with reference to Fig. 11, the rolls 76 and 77 of each of the devining apparatus are driven from the sprocket 80, and the driven sprocket 82. As the speed of the shaking and conveyor elevators 33 is changed, the speed of the devining apparatus proportionately changes. Reversal of the change speed transmission 270 likewise reverses the direction of the rolls of the devining apparatus, and the reverse gear is used to clear any obstruction from the elevators 33, or the devining apparatus 61. Clogging of either of these mechanisms is noted by the ratcheting of the slip clutch members 278.

The drive shaft 268 at its front end is operatively connected to a sprocket 282 for driving a shaft 283 through a chain drive 284 operatively connected to a sprocket 285 on the shaft 283. The chain 284 runs over similar sprockets 286 and 287, the sprocket 287 serving as a chain tightener through suitable tightening apparatus (not shown) Fig. 6. The chain 284 also drives a sprocket 288' operatively connected to the shaft 288 which drives the roller 102 of the devining apparatus through the chain device 289 and drive shaft 290. The shaft 283 drives the roller 101 of the devining apparatus 100. The drive shaft 283 also drives the transverse conveyor 75 through the chain drive 291 extending about the sprockets 111 and 112, Figs. 6 and 9. The rollers 101 and 102 are directly driven from the shafts 283 and 288 so that the rolls 101 and 102 rotate in the direction of the arrows, Fig. 10, to discharge any remaining vines or weeds between the rolls to the ground. The speed of the rolls 101 and 102 varies with the speed of the engine as it is throttled between 1800 and 2200 r.p.m., and likewise, the transverse conveyor 75 is similarly varied by the changing of the speed of the engine.

The sorting and elevator conveyor 70, the transverse elevating conveyor 139 in the embodiment of Figs. 1 and 2, and the extension elevator of the embodiment of Figs. 3 and 6 are driven through a sheave 295 operatively mounted on the end of the drive shaft 268, which is connected to the engine shaft 296 through the transmission drive 297 connected to the transmission 267. The drive 297 is mounted within the housing 298. The engine drive shaft 296 also actuates the conveyor 75, as described above. A flexible belt drive 299 extends over the variable pitch pulleys 295 and 300. The pitch diameters of the variable pitch pulley 300 varies from a minimum of 3.8 inches to a maximum of 7.7 inches, and the pitch of the sheaves is adjusted through a control knob 301 operatively connected to a shaft 302 and the sheave mechanism, Fig. 7, and extends within reach of the operator in order that the speed of the elevators 70 and 130 may be varied to suit the operating conditions. A pulley 303 is operatively connected to the shaft of the sheaves 300, and through a chain drive 304, actuates a sprocket 305 mounted on a longitudinally extending shaft 306. The shaft 306 is operatively connected to the beveled gears of a gear box 307, and a transverse shaft 308 drives the conveyor elevator 70, while the shaft 306 drives the transverse elevator 130 of the embodiment of Figs. 1 and 2, and the extension elevator of the embodiment illustrated in Figs. 3 and 6. The shaft 308 is journaled in a bearing (not shown) suitably mounted on the inner side frame of the elevator 70, and drives the drive shaft 127 for the conveyor 70 through a chain drive 309 extending over sprockets 310 and 311. The bearings 128 supporting shaft 127 may be adjusted to tighten the chain 309, as is well understood in the art.

Referring to Figs. 6 and 7, the sprocket 305 is operatively connected to the shaft 306 through a slip clutch mechanism 312 which comprises a clutch 313, a compression spring 314, and an adjusting nut 315. One of the ratchet members of the ratchet clutch 313 operatively connects the sprocket 305 to the shaft 306. The shaft 195 or 306 is provided with a sprocket 316 which drives the shaft 141 of the transverse elevator conveyor 130 through the chain 143 extending over the driven sprocket 142 connected to the shaft 141 of the embodiment illustrated in Fig. 7. In the extension elevator of the potato harvester illustrated in Figs. 3, 4, and 6, a chain drive 143', similar to the chain drive 143 of the embodiment of Fig. 7, drives the drive shaft 197 through a sprocket 196. As described with reference to Fig. 4, the chain drive 199 actuates the chain drive 201 to drive the shaft 193 which supports the sprockets 192 for the conveyor chain 139'. Although the extension elevator 139' is partially driven through the shaft 197 and associated sprockets 198, and the shaft 179 and its associated sprockets 180, the main drive therefor is the shaft 193 and its associated sprockets 192. The slip clutch 312 prevents breakage of the drive for the conveyors 70 and 130 if any obstruction is caught in the chain links, or if the load on the elevators becomes excessive.

Referring particularly to Fig. 6, the three-speed transmission 270 permits the speed of the elevators 30 of the digger units to be actuated at a linear speed slightly faster than the speed of the tractor in low direct drive, or in over-drive, and further variation is obtained by throttling of the engine from its low speed of substantially 1800, to its high speed of 2200 r.p.m. The conveyor elevator 30 in the low speed position of the transmission, and with the tractor operating in low, operates at a linear speed of 77–120 feet per minute; in direct drive the linear speed is 137–217 feet per minute; and in overdrive position the linear speed is 190–302 feet per minute, depending upon the engine speed. It is to be understood that under certain digging conditions, the potato harvester may be pulled at one speed, and the elevators 30 operated at another speed, though in normal digging conditions the transmission of the potato harvester is set to correspond to the low direct and overdrive speed of the tractor. If an obstruction is encountered, the slip clutches 277 of the respective digger units will slip, and to clear the obstruction, the transmission 270 may be moved to its reversed position to rotate the conveyors in the opposite direction to the normal digging direction.

The rolls 76 and 77 of the devining apparatus 61 for each of the elevators 30 in the low speed position of the transmission, and depending upon the engine speed having a linear speed of 153–238 feet per minute, in direct drive 272–430 feet per minute; and in over-drive 380–600 feet per minute, may have their direction reversed along with the elevators 30 upon the transmission 270 being placed in reverse gear.

The transverse conveyor 75, since it is directly connected to the motor through the drive shaft 296 will be actuated at a linear speed of 105–165 feet per minute, depending upon the throttle setting, and the rolls 101 and 102 of the devining apparatus 100 will have a linear speed of 288–450 feet per minute. The sorting and elevating conveyor, as it is also directly connected to the engine, may be varied by the speed of the engine, as well as through the control of the variable pitch pulleys 295 and 300, and will have a linear speed of 42–277 feet per minute. The extension elevator of the potato harvester illustrated in Figs. 1, 2, and 3 is set to have substantially the same range of speed as the sorting and elevating conveyor 70, and since the speed thereof is controlled also through the variable pitch sheaves 295 and 300, and the engine speed, the linear speed of the extension elevator is variable within the range of 45–287 feet per minute. If any obstruction should stop the conveyors 70 and 130 and the extension thereof, the slip clutch 312 will ratchet, preventing destruction of any of the drives for this conveyor. Suitable slip clutches may also be supplied in the drives for conveyor 75.

In the operation of either of the embodiments of the potato harvester wherein the potatoes may be bagged directly on the harvester, or loaded into a vehicle driven alongside of the harvester, an operator normally stands on an operation platform 320 mounted on the frames 20 and supported by a frame 321, or he may sit on a seat 250 supported by uprights 251 mounted on the frame 321. All of the control levers for the adjusting of the digger units, including the hand adjusting levers 241 and the hydraulic levers 249, are positioned in easy reach of the operator. In the embodiment of Fig. 3, the controls 221 and 222 for the elevator extensions 176 and 177 are placed alongside the hydraulic control 249, Fig. 3.

The starting and control of the engine speed is operated through a throttle 325 after the engine has been started by a button 326 when the engine has been turned on by an ignition switch 327. The throttle control extends through a Bowden wire 328, and the switches 326 and 327 manipulate levers 329 and 330 extending to a panel 331. Although in this embodiment shown in Fig. 7, the controls extend over the top of the elevator, it is to be understood that it is within the scope of the invention that the controls may be mounted on the panel board directly mounted on the rear frame 136 of the conveyor so that there is no obstruction to the potatoes as they are elevated by the conveyor 139. The engine clutch is operated through a lever 332, and its associated rod 333 extending to the transmission of the engine. Likewise in Fig. 7, the clutch is shown mounted on the front frame 136, and it is to be understood that it is within the scope of the invention that the clutch lever 322 may be so mounted as to be positioned alongside of the transmission control lever 334, which is a wobble type of lever supported on a bracket 335 affixed to the transverse frame 147. The link 336 extends from the lever 334 to a gear shift lever 337 of the gear box 270. As a safety feature, an extension link 338 operatively connected to the clutch lever 334 extends rearwardly to the rear end of the machine, and is pivotally connected to a transverse lever 339 pivoted on a cross bar 340, Fig. 3. As the machine is driven down the field, an operator usually walks behind the harvester watching the discharge of the conveyors 30 upon the transverse conveyor 75. If the load becomes too great, or any obstruction is encountered, the operator at the rear of the machine may de-clutch the engine by movement of lever 339, independently of the front operator through his control of the clutch by the lever 334.

One or more operators may also be stationed on a platform 343 supported from the main frame by brackets 344 and a brace 345 for sorting stones, and other debris, from the potatoes as they are elevated on the sorting and elevating conveyor 121. The number of operators mounted on this platform depends in a large part upon the yield of the potatoes being dug, or the rate of speed at which the harvester and elevator are run. If necessary, an additional operator may be stationed on a platform 346 mounted on a supporting frame 347 attached to the side frame 19, and suitably braced, Figs. 2, 3, and 8. The operator in this position may assist in sorting the potatoes as they are discharged from the elevator 121 to the transverse conveyor elevator 130. Whenever the load is sufficiently light, the operator who controls the depth of digging and the speed of the elevator, standing on the platform 320 at the front of the digger, may also use the platform 346 to remove any obstruction. The bagging is carried on, when the potatoes are sacked directly on the harvester, by one or more operators standing on the platform 167, Fig. 1. Platform 107′, Fig. 1, may also be used for sorting, etc. Also, when the harvester is used to directly load the potatoes to a vehicle alongside, the operators may, if necessary, stand on platform 343′, Fig. 3, although normally it is not necessary when used for direct loading to a vehicle. The support braces 58, Figs. 1 and 9, although primarily used for bracing the upper end of the digger, under certain conditions may be used in sorting large stones, and the like, from the digger elevators, or even from the transverse conveyor 75. Normally, however, an operator walks by the digger, as described above. If necessary, it is within the scope of the invention that suitable seats may be positioned on the transverse frame 68 so that any sorting may be done directly from the conveyor 75.

Also, in the normal operation canvas flaps 348 are directly mounted on the sheet metal supports 58, Figs. 1 and 9, being shown in their operative position in Fig. 1, and raised in Fig. 9, and in their normal, lowered position and additionally serve to direct the vines, weeds, etc., into the rolls 76 and 77 of each of the devining apparatus 61 as the rolls rotate to discharge the vines to the ground. The flaps also reduce the speed of the potatoes delivered to the transverse conveyor 75 to prevent bruising. The rolls also serve in arresting the fall, particularly as they are resilient. A similar flap 349 mounted on a transverse brace 350 directs any remaining vines and weeds to the devining apparatus 101, and likewise, reduces the bruising of the potatoes as they discharge from the end of the conveyor 75 to the elevator 121.

Wherever necessary, shields, such as 351, 352 protect the operators and any debris from being caught in the various drive mechanisms. A shield 353, Fig. 7, is also provided underneath the lower flight of the transverse conveyor 139 to prevent dirt and debris from falling into the variable speed drive 299.

Various chain tighteners are provided for the drive mechanism and the conveyors, such as the chain tightener 354 for the transverse conveyor elevator 139, Fig. 7; chain tightener 355 for the sorting and elevating conveyor 121, Fig. 2; and a tightener 356 for each of the digger elevators, Fig. 2. Tighteners 357 are provided for each of the drives of the devining apparatus 61 of the digger units, Fig. 10, and a chain tightener 358 is provided for the chain drive of the sheaves 283 and 288, Fig. 2. A chain tightener 359 is also provided for the drive chain 143, Fig. 7. It is also to be understood that wherever necessary, chain tighteners may be provided within the scope of the invention. The various adjusting mechanisms have been provided wherever possible to be conveniently adjusted exteriorly of the harvester to particularly aid in any adjustments necessary while the harvester is being used in the field.

The pump for the hydraulic mechanism is a unitary construction mounted directly upon the tank 220, Fig. 1, and the pulley 360 connected to the pump is driven by a belt 361 directly connected from a sheave 362 directly connected to the end of the main drive shaft 268. The hydraulic unit, which is a commercial unit, is modified by having its valve 363 secured in its open position. The operation of the hydraulic cylinders for the lever of the digger units, and the elevating of the extension elevators 176 and 177 from the operator's station through the respective control valve has been previously described above. The hydraulic unit 220 is suitably supported from a support bracket 364, Fig. 1.

Although the potato harvester has been particularly described as having the various elevators and drive mechanism driven from an auxiliary engine 256 of the type illustrated, it is also to be understood that any conventional form of auxiliary motor, as used for driving mechanisms of agricultural apparatus, may be used, the only requirement being that suitable supports be provided for the particular motor, and the drives connecting the motor to the main drive of the harvester similarly are varied. It is also within the scope of the invention that the potato harvester may be directly driven from the power take-off of the tractor through a drive D, shown in dashed lines, Fig. 2. However, in directly driving the harvester from the power take-off of the tractor, the tractor must be able to furnish not only sufficient power to provide the tractive effort for pulling the harvester under all surface conditions, but to additionally provide sufficient power for operating the various conveyors and mechanisms of the harvester. When a power take-off is used, normally telescoping shafts are connected to the power take-off unit, and a pillow block (not shown), is mounted on the bracket 56, Fig. 8, and inclined to support a shaft having at each end a universal joint, the universal joint at the upper end being directly connected to the end 365 of the shaft 268, Fig. 2, the drive being shown schematically at D.

Referring to Fig. 12, the helical pulley 74 for preventing any building up of mud and debris between the pulley and the flights of the conveyor 75 has been described as a single helix. It is also within the scope of the invention that a double helix may be used by providing an additional helical conveyor 74' between the first conveyors 74, as shown in part in solid and dash lines.

Normally the potato harvester is assembled in the factory for the particular row spacing ordered. However, under certain conditions it may be necessary to change the row spacing of the digger units in the field to some other spacing other than originally shipped, particularly as certain areas of the country plant their potatoes at different row spacings, depending on the soil and yield desired. The change in spacing is provided by adjusting the left digger with respect to the right digger by having holes spaced in certain transverse frame members to provide for this adjustment. The left digger unit is actually pivoted about its rear support so that the intermediate spacing of the holes between the rear and front of the digger vary to compensate for this angular adjustment. Certain of the holes for adjusting the digger are shown in Figs. 7 and 8, and it is quite apparent that by adjusting certain of the members 231 and 146 with respect to the frame members 147, and also the members 52 and 55 with respect to the members 53 and 54, Fig. 8, that the digger unit may be adjusted to the particular row spacing desired. In Fig. 7, the digger units are shown spaced in their maximum row spacing of 42 inches.

In certain digging conditions, where the soil is still wet, or where it is necessary to set the shovels 45 at greater depths to prevent cutting of the potatoes, it is necessary to provide greater agitation to the digger elevators 30. Usually this can be accomplished by providing larger agitators 49, but this is a field change, and somewhat difficult at times because of the location of the agitators. However, a simple adjusting mechanism has been provided for the agitators by arcuately raising and lowering the agitators from the forward operator's station. The agitators 49 for each digger unit are supported on brackets 385 affixed to a transverse rock shaft 386, Fig. 3. Levers (not shown), are connected to the inner ends of each of the rock shafts and, in turn, connected by links to a downwardly and rearwardly adjusting bar 387, Fig. 2, extending through a slot 388 in the frame upright 389, Fig. 7. The bar 387 is provided with notches for adjustably engaging the slot in each adjusted position of the bar. A handle 387' permits manipulation of the bar to simultaneously adjust the rock shafts for the agitating desired. As the agitators are moved forwardly, the agitation is increased, and the agitation is decreased by moving the agitators rearwardly. Also, agitation may be increased or decreased by varying the speed of the conveyors by controlling the engine speed, and/or further controlling the elevator speed by shifting the gears of the transmission 270.

Under certain digging conditions, it is also desirable to change the type of shovel from a short shovel, as shown, to a long shovel, or other forms of shovels found suitable for various digging conditions. When the shovels are set deeper, greater agitation of the digger elevator is also required, which may be readily adjusted from the operator's station by the manipulation of the handle 387'.

Referring to Fig. 13 which illustrates the right side of the potato harvester, an improved attachment for use in conjunction with the devining rolls 76 and 77 as illustrated schematically in Fig. 6 is illustrated. Certain digging conditions, especially where the potato vines are still somewhat green and have not fully dried out, and the growth of the vines is somewhat luxuriant, it has been found that there is a tendency for the vines as they are detached from the potatoes to wrap around the rolls overloading the digger, causing it to stop and requiring additional time to free the vines from the rolls. In order to overcome this condition, it has been found that placing continuous belts 390 and 391 about the upper and lower rolls 76 and 77 of the digging units and of sufficient length prevents the vines from continuing about the smaller diameter rolls 76 and 77. The belts are preferably rubberized canvas belts and the width thereover being substantially the length of each of the rollers 76 and 77. The upper belt 390 at its lower end passes about a smaller diameter roller 392 than that of the upper roll 76, and the bottom belt passes over a similar roller 393 so that there is formed a V-shaped opening between the bottom flight of the upper conveyor and the upper flight of the lower conveyor, which run in the direction indicated by the arrows. The shaft of the lower roller 393 is suitably journaled in brackets 394 mounted on the members 32 of the main frame 15. It is preferred that the bearing brackets 394 may be adjusted slightly along the members 32 to provide means for suitably tightening the belt.

The upper roller 392 is rotatably mounted on a suitable rod or shaft 395 which in turn is carried by respective arms 396. To provide for tightening the upper belt 390 and to adjust the opening between the belts, arms 396 are pivotally mounted adjacent their opposite ends on the main frame 15 as indicated at 397. Adjustment of the arms 396 about their pivotal connection 397 is controlled by the locking links 398 pivotally mounted at an end to the frame 15 as indicated at 399, the opposite ends being provided with an elongated slot 401. Each is adjustably secured to its respective arm 396 by suitable means such as the bolt 402 and cooperating nut, the bolt extending through the slot 401 and a hole in the arm 396. Thus the belt 390 may be adjusted by varying the relationship of the arm 396 and adjacent end of the link 398. If desired, additional holes may be provided in the arms 396, as illustrated to provide a greater range of adjustment.

In the construction illustrated in Fig. 13, the arm 91 is spring-biased by the spring 94' and rod 95', the upper end of the spring 95' being secured to the end of the arm 91, and the opposite end engaged with the upper end of the rod 94'. The lower end of the latter extends through a hole in the flange of the frame member 19 and is held in operative position by nuts 96, which may be tightened or loosened to effect an adjustment of the spring action.

In the operation of this devining attachment which supplements the devining rolls, the upper belt 390 is positioned as shown in Fig. 13 with the upper flight of the belt 390 below the digger chain 33 for each of the digger units. Each of the belts 390 and 391 may be vulcanized to provide a continuous attachment, or fabricated to be detached by suitable connection to permit the mounting and demounting of each of the belts about the rolls 76 and 77 without the need of dismantling the harvester completely. However, when the units are factory-assembled, a continuous belt may be used; and for repairs in the fields, a separable belt is preferable.

It is to be understood that it is within the scope of the invention that the potato harvester may be used with the devining rolls 76 and 77 as illustrated schematically in Fig. 6; and in Fig. 9 it is within the scope of the invention, but the potato harvester may be used with the additional devining attachment comprising the continuous belts 390 and 391 mounted upon the rollers 76 and 77 in certain heavy digging conditions to prevent the wrapping of the vines about the rolls as illustrated schematically in the dotted lines 390 and 391, Figs. 6 and 10 and shown in perspective, Fig. 9. Although it is not usually necessary to have the additional devining belts 390 and 391 used in connection with the devining rolls 101 and 102 at the discharge end of the conveyor belt 75, it is to be understood that it is within the scope of the invention that a similar devining attachment including the continuous belts 390 and 391 may be operatively mounted over the rolls 101 and 102, Figs. 6 and 9, as shown in the dotted lines, and supported from the transverse frame members 68 in the manner as illustrated for the devining belts for the main digger chains 33.

In the operation of the devining belt attachment, each of the belts 390 and 391 are rotated in the direction of the arrows, Fig. 13, corresponding to the direction of rotation of the rollers 76 and 77 for each of the digger units, as shown schematically in Fig. 6. The spacing of the lower flight of the upper belt 390 and the upper flight of the lower belt 391 at their lower ends to provide a V-shaped opening between the belts prevents any travel of the vines rearward to wrap around the rollers 76 and 77, so that the vines remain on the upper flight of the lower belt 391 and discharge over the lower end on the ground between the frame members of each of the digger units. When it is desired to provide the devining belts upon the rollers 101 and 102, if there is such a discharge of excess vines from the conveyor 77 as to be wrapping about the rolls 101 and 102, the devining belts, when mounted about these rolls, perform in the same manner as those for the main digger units. However, when belts are used about the rolls 101 and 102, the vines are discharged underneath the conveyor 75 and rearward of the frame member 68.

Having thus described the particular embodiments of the potato harvester which is adapted for directly sacking the potatoes on the harvester, or delivering them to a vehicle, it is obvious that a simple arrangement has been provided in each of the embodiments for a multirow digger unit capable of removing excess vines and weeds from the soil and potatoes as the rows are dug, and which may be further additionally sorted to eventually provide clean potatoes for sacking or bulk loading, after which the potatoes may be further sorted and graded in the field station for market. In assembling the various conveyors, standard twenty-four inch conveyor units provided by the usual potato digger links have been assembled as described so that, as the potatoes are elevated and conveyed, a minimum amount of bruising is obtained. Simple mechanism has also been provided for controlling the speeds of the digger units and conveying units independently with respect to each other through change speed mechanism, and the variable drive mechanism that the harvester is adapted for digging fails, allowing two hundred to six hundred bushels of potatoes to the acre, so that as the sorting elevators are controlled at such a rate of speed within the ranges set forth, the operators may efficiently sort the debris from the potatoes, also removing any bruised potatoes.

It is also evident that simple drive mechanisms have been provided for each of the conveyors and controls for controlling the operation thereof within three selected rates of travel for the efficient operation of the harvester. Likewise, the controls for adjusting the depth of digging, and the height of it as to elevators, have been arranged so that they may all be operated by a single operator, who can watch the digging and amount of material on the elevators to efficiently control the operation of the unit. It is also obvious that an efficient harvester unit has been provided which is normally used for two-row digging thereof, and under certain digging conditions, it is adapted to be operated as a single digging unit with one of the digging units raised. The harvester is equally adapted to have power furnished from an auxiliary motor directly mounted on the unit, or to have the power directly supplied from the power take-off of the tractor to which it is attached. Furthermore, the harvester is adapted for row spacing in any section of the country where a harvester of this type is feasible.

Having thus described my invention, it is obvious that various immaterial modifications may be made in the same without departing from the spirit of my invention; hence, I do not wish to be understood as limiting myself to the exact form, construction, arrangement, and combination of parts herein shown and described, or uses mentioned.

What I claim as new and desire to secure by Letters Patent is:

1. A potato digger having a mobile frame, digging means on said mobile frame, and conveying means extending upwardly and rearwardly from said digging means, and including devining means adjacent the upper end of said conveying means, said devining means comprising a pair of cooperating rotary members, and said cooperating rotary members having axes which lie in a plane extending downwardly and rearwardly from the upper end of said conveying means.

2. A potato digger according to claim 1, wherein said pair of cooperating rotary members comprise a plurality of contacting rolls operatively and contiguously arranged transverse to the upper discharge end of the shaking conveyor, the rotation of said rolls being in directions operative to substantially reverse the direction of movement of any vines discharged from the shaking conveyor whereby such vines are withdrawn out of the path of potatoes discharged from said conveyor, and power actuated drive means for actuating said shaking conveyor and said devining means operatively connected together, whereby any vines on the separating conveyor are discharged between the rolls to the ground and any potatoes retained on the vines are detached so that the potatoes on the separating conveyor are discharged from the separating conveyor substantially free from vines.

3. A potato digger according to claim 1, wherein said digging means comprises a plurality of digger units operatively mounted on said mobile frame, and said conveying means including a shaking conveyor for each of said digger units, and said pair of cooperating rotary members for said devining means for each of said digger units comprising contacting and yielding rolls operatively and contiguously arranged transverse to the upper discharge end of the shaking conveyor, the rotation of said rolls being in directions operative to substantially reverse the direction of movement of any vines discharged from the shaking conveyor whereby such vines are withdrawn out of the path of potatoes discharged from said conveyor, and drive means for actuating each of said shaking conveyors and devining means operatively connected together, whereby any vines on each shaking conveyor are discharged between the rolls to the ground and any potatoes retained on the vines are detached so that the potatoes on each shaking conveyor are discharged from each shaking conveyor substantially free from vines.

4. A potato digger according to claim 1, wherein said conveying means is an elevating conveyor, and said pair of cooperating rotary members comprise a plurality of contacting rolls operatively and contiguously arranged transverse to the elevating conveyor and operatively mounted contiguous to and below the upper end of the elevating conveyor, and drive means for actuating said elevating conveyor and contacting rolls operatively connected together, whereby as the upper flight of the elevating conveyor is driven upwardly, the direction of travel of the rolls at the line of contact is in the direction of the lower flight of the elevating conveyor whereby the direction of travel of any vines is substantially reversed to withdraw such vines from the path of potatoes discharged from said elevating conveyor.

5. A potato digger according to claim 1, wherein said pair of cooperating rotary members comprise a plurality of contacting rolls, said axes of the contacting rolls being parallel and transverse to the direction of motion of said conveying means, said conveying means being a shaking conveyor, said contacting rolls operatively mounted below and contiguous to the upper end of the shaking conveyor, and a transversely extending conveyor operatively mounted on the main frame and to the rear of and below the shaking conveyor and devining means, whereby the potatoes are discharged from the shaking conveyor, and the vines are discharged from the rolls downwardly between the shaking conveyor and transversely extending conveyor to withdraw any such vines from the path of potatoes discharged from said shaking conveyor.

6. A potato digger according to claim 1, wherein said digging means includes at least one digger unit operatively mounted on said mobile frame, said conveying means comprising a shaking and elevating conveyor extending upwardly from said digging unit, and including a transversely extending conveyor having an upper and lower flight operatively mounted on the main frame, and to the rear of and below the discharge end of the shaking and elevating conveyor to receive the potatoes discharged therefrom, said cooperating rotary members comprising a plurality of rolls operatively mounted for rotating in opposite directions and biased toward each other and positioned between and below and contiguous to the discharge end of the shaking and elevating conveyor and along the upper flight of the transverse conveyor, whereby the vines are reversed in direction of movement and withdrawn out of the path of potatoes discharged from the elevating conveyor and discharged to the ground between the biased rolls and the potatoes on the vines are devined and along with the other potatoes elevated and cleaned are delivered to the upper flight of the transverse conveyor.

7. A potato digger according to claim 6, wherein said rolls are rotatable in a direction to reverse the direction of movement of vines discharged from said conveyor, withdrawing said vines from the path of potatoes discharged therefrom, and another devining means comprising upper and lower contacting rolls operatively mounted contiguous to the discharge end of the transversely extending conveyor to discharge any vines on the transverse conveyor to the ground between the rows as the potatoes on the transverse conveyor are discharged therefrom over the devining means.

8. A potato digger according to claim 7, including power actuated drive means operatively arranged on the potato digger for actuating said shaking and elevating conveyor, transverse conveyor and devining means operatively connected together, whereby as the upper flight of the shaking and elevating conveyor is driven upwardly and the upper flight of the transverse conveyor is driven laterally of the shaking and elevating conveyor, the direction of travel of the rolls at the line of contact is in the direction of the lower flights of said shaking and elevating conveyor and transverse conveyor.

9. A potato digger according to claim 1, wherein said conveying means includes a plurality of elevating conveyors, said devining means provided for each elevating conveyor and adapted to separate and devine the potatoes from the vines as the potatoes and vines are discharged from the elevating conveyors, said cooperating roller members of each devining means comprising upper and lower resiliently faced rolls operatively mounted to be biased together in contacting relationship, resilient means for biasing the rolls together in contacting relationship, each devining means operatively mounted upon the mobile frame below and to the rear of the discharge end of its respective elevating conveyor, and drive means for operatively rotating the rolls of each devining means in the same direction at their line of contact, the rotation of said rolls of each devining means being in directions operative to substantially reverse the direction of movement of any vines discharged from each elevating conveyor whereby such vines are withdrawn out of the path of potatoes discharged from such elevating conveyor to discharge the vines forward of each set of rolls as the potatoes are discharged to the rear of each set of rolls.

10. A potato digger according to claim 1, wherein said conveying means includes at least one elevating conveyor and drive means therefor, said devining means adapted to separate and devine the potatoes from the vines as the potatoes and vines are discharged from the potato digger, and comprising in combination, a transverse conveyor adapted to be operatively mounted laterally with respect to the elevating conveyor, said pair of cooperating rotary members comprising upper and lower rollers operatively mounted to be biased together in contacting relationship, and also operatively mounted between the elevating conveyor and transverse conveyor and below and to the rear of the discharge end of the elevating conveyor, the rotation of said rolls being in directions operative to substantially reverse the direction of movement of any vines discharged from the elevating conveyor whereby such vines are withdrawn out of the path of potatoes discharged from said conveyor, another set of upper and lower rollers operatively mounted contiguous to the discharge end of said transverse conveyor, and independent drive means for actuating the rollers of each set from the drive means for its respective elevating conveyor, whereby the elevating conveyor and its contiguous set of rollers and the transverse conveyor and its set of rollers are adapted to be either independently or simultaneously actuated.

11. In a potato digger according to claim 7 including a forwardly inclined sorting and elevating conveyor operatively mounted on the mobile frame and adapted to receive the unsorted potatoes and trash discharged from the transverse conveyor, an elevating conveyor transverse to the shaking and elevating conveyor and sorting and elevating conveyor and operatively mounted on the front of the mobile frame to receive the cleaned and sorted potatoes from the sorting and elevating conveyor, drive means for driving said conveyors and each of said devining means operatively connected together, drive means for operating the transverse conveyor and its devining apparatus and the sorting and elevating conveyor and transverse conveyor operatively connected together and independently of the shaking and elevating conveyor and its contiguous devining apparatus, and power means operatively connected to the aforesaid plurality of drive means.

12. In a potato diggger according to claim 1, wherein said digging means comprises a plurality of digger units operatively mounted on said mobile frame, said conveying means including a shaking and elevating conveyor for each of said digger units, and said devining means operatively related to each of said shaking and elevating conveyors, and including a transverse conveyor adapted to receive material from each of the shaking and elevating conveyors after traversing their respective devining means, devining means for the transverse conveyor, sorting and elevating conveying means adapted to receive material discharged from the transverse conveyor after traversing its respective devining means, drive means for independently operating the transverse conveyor, its contiguous devining means and the sorting and elevating conveying means, all operatively driven together from the drive means, whereby excess material may be removed from the transverse conveyor, its devining means and sorting and elevating conveying means without receiving material from the shaking and elevating conveyors after it has been discharged over their respective devining means, and power means operatively connected to the aforesaid drive means.

13. A potato digger according to claim 1, wherein said digging means includes at least one digger unit operatively mounted on said mobile frame, said conveying means comprising a shaking conveyor extending upwardly from said digger unit, and said devining means comprising divergently and downwardly extending belt means operatively and contiguously arranged transverse to the upper discharge end of the shaking conveyor and extending forwardly and beneath the rear end of the shaking conveyor operative to reverse the direction of vines discharged from the shaking conveyor and withdraw such vines from the path of potatoes discharged from said conveyor, and drive means for actuating said shaking conveyor and said devining means operatively connected together, whereby any vines on the separating conveyor are discharged between the belt means to the ground and any potatoes retained on the vines are detached so that the potatoes on the separating conveyor are discharged from the separating conveyor substantially free from vines.

14. A potato digger according to claim 1, wherein said digging means includes a plurality of digger units operatively mounted on said frame, said conveying means including a shaking conveyor extending upwardly from each of said digger units, the aforesaid devinging means for each of said digger units, each of said devining means comprising a plurality of contacting and yielding and divergent belt means operatively and contiguously arranged transverse to the upper end of the shaking conveyor, said divergent belt means extending forwardly beneath the shaking conveyor of each digger unit, and drive means for actuating each of said shaking conveyors and devining means operatively connected together, whereby any vines on the shaking conveyor are withdrawn out of the path of potatoes discharged from said shaking conveyor and discharged between the rolls to the ground and any potatoes retained on the vines are detached so that the potatoes on the shaking conveyor are discharged from the shaking conveyor substantially free from vines.

15. A potato digger according to claim 1, wherein said digging means includes at least one digger unit operatively mounted on said mobile frame, said conveying means including an elevating conveyor for the digger unit operatively mounted on said mobile frame and extending upwardly with respect thereto, said cooperating rotary members of said devining means comprising a pair of transverse rolls, a plurality of contacting belt means operatively and contiguously arranged beneath the elevating conveyor, the upper bight portion of said belt means operatively mounted about its respective transverse roll, and drive means for actuating said elevating conveyor and contacting belt means operatively connected together, whereby as the upper flight of the elevating conveyor is driven upwardly, the direction of travel of the belt means at the line of contact is in the direction of the lower flight of the elevating conveyor whereby the direction of vines discharged from said elevating conveyor is reversed and such vines are withdrawn out of the path of potatoes discharged from said conveyor.

16. A potato digger according to claim 15, wherein said elevating conveyor is a shaking conveyor, and including a transversely extending conveyor operatively mounted on the mobile frame and to the rear of the shaking conveyor and devining means, whereby the potatoes are discharged from the shaking conveyor, and the vines are discharged from the belt means downwardly between the shaking conveyor and transversely extending conveyor.

17. A potato digger according to claim 16, wherein said transversely extending conveyor comprises an upper and lower flight operatively mounted on the mobile frame, and to the rear of and below the discharge end of the shaking and elevating conveyor to receive the potatoes discharged therefrom, said belt means formed as a plurality of divergent belt means extending forwardly beneath the shaking and elevating conveyor and operatively mounted for rotating in opposite directions and biased toward each other and positioned between the discharge end of the shaking and elevating conveyor and along the upper flight of the transverse conveyor, whereby the vines are withdrawn from the path of potatoes discharged from said shaking and elevating conveyor and discharged to the ground between the biased belt means and the potatoes on the vines are devined and along with the other potatoes elevated and cleaned are delivered to the upper flight of the transverse conveyor.

18. A potato digger according to claim 1, wherein said digging means comprises a plurality of digger units operatively mounted on said mobile frame and said conveying means comprises a shaking and elevating conveyor extending upwardly from each of said digging units, and including a transversely extending conveyor having an upper and lower flight operatively mounted on the mobile frame, laterally to the rear of and below the shaking and elevating conveyors, the aforesaid devining means provided for each of said shaking and elevating conveyors, each of said devining means comprising a plurality of contacting and divergent belt means operatively mounted on said cooperating rotary members for rotating in opposite directions and biased toward each other and positioned between the discharge end of the shaking and elevating conveyor and along the upper flight of the transverse conveyor, each of said divergent belt means operatively mounted to extend forwardly beneath its respective shaking and elevating conveyor, whereby the vines from each shaking and elevating conveyor are substantially reversed in direction and withdrawn out of the path of potatoes discharged from said shaking and elevating conveyor and are discharged to the ground between the biased belt means of each devining means, and the potatoes remaining on the vines are devined and along with the other potatoes elevated and cleaned are delivered to the upper flight of the transverse conveyor.

19. A potato digger according to claim 1, wherein said digging means includes at least one digger unit operatively mounted on said main frame, said conveying means comprising a shaking and elevating conveyor extending upwardly from said digging unit, said cooperating rotary members of said devining means comprising upper and lower rolls, said devining means also including upper and lower contacting belt means operatively trained over said rolls and contiguously arranged transverse to the upper end of said shaking and conveying elevator, said upper and lower belt means extending forwardly beneath said shaking and elevating conveyor, whereby vines discharged from said shaking and elevating conveyor are substantially reversed in direction and withdrawn out of the path of potatoes discharged from said shaking and elevating conveyor, a transversely extending conveyor operatively mounted on the mobile frame below and to the rear of said devining means and adapted to receive and transfer the potatoes which have been devined laterally of the longitudinal axis of the shaking and elevating conveyor as the vines are discharged between the rolls of the devining means and to the ground, and another devining means comprising upper and lower rolls and upper and lower belt means trained over said rolls and operatively mounted contiguous to the discharge end of the transversely extending conveyor to discharge any vines on the transverse conveyor to the ground between the rows as the potatoes on the transverse conveyor are discharged therefrom over the devining means.

20. A potato digger according to claim 19, including power actuated drive means for actuating said shaking and elevating conveyor, transverse conveyor and devining means operatively connected together, whereby as the upper flight of the shaking and elevating conveyor is driven upwardly and the upper flight of the transverse conveyor is driven laterally of the shaking and elevating conveyor, the direction of travel of the belt means at the line of contact is in the direction of the lower flights of said shaking and elevating conveyor and transverse conveyor.

21. A potato digger according to claim 1, wherein said conveying means includes at least one elevating conveyor and said devining means adapted to separate and devine the potatoes from the vines as the potatoes and vines are discharged from the conveyor, said pair of cooperating rotary members comprising upper and lower resiliently faced rolls and belt means operatively mounted thereon and operatively mounted to be biased together in contacting relationship, resilient means for biasing the rolls and belt means together in contacting relationship, said axes of the rolls and belt means lying in the aforesaid plane downwardly inclined with respect to the elevating conveyor upon operatively mounting the devining means upon the potato digger below and to the rear of the discharge end of the elevating conveyor of the potato digger whereby the direction of vines discharged from said elevating conveyor is substantially reversed and such vines are withdrawn out of the path of potatoes discharged from said elevating conveyor, and drive means operatively connected to the upper and lower rolls for operatively rotating the rolls and belt means in the same direction at their line of contact.

22. A potato digger according to claim 1, wherein said conveying means includes at least a plurality of elevating conveyors, and said devining means provided for each of said elevating conveyors and adapted to separate and devine potatoes from the vines as the potatoes and vines are discharged from the elevating conveyors, said devining means for each of said elevating conveyors comprising laterally spaced sets of upper and lower resilient belt means operatively mounted on their respective cooperating rotary members to be biased together in contacting relationship, resilient means operatively connected to said belt means of each set for biasing the belt means of each set together, said axes of each set of belt means lying in a plane downwardly inclined with respect to the elevating conveyor upon operatively mounting the devining means upon the potato digger with each set of belt means of the upper ends thereof operatively mounted below and to the rear of their respective elevating conveyors, and drive means operatively connected to the belt means of each set for rotating the belt means of each set in the same direction at their line of contact to withdraw the vines discharged from the said elevating conveyors out of the path of potatoes discharged from said elevating conveyors and discharge the vines forward of each set of belt means as the potatoes are discharged to the rear of the rolls.

23. A potato digger according to claim 1 wherein said conveying means includes at least one shaking and elevating conveyor, and said devining means adapted to separate and devine the potatoes from the potato digger as the potatoes and vines are discharged from the potato digger, and comprising in combination, a transverse conveyor adapted to be operatively mounted laterally with respect to the shaking and elevating conveyor and extending over laterally spaced drive and driven pulleys, said pair of cooperating rotary members comprising a set of upper and lower rollers operatively mounted upon the potato digger between the shaking and elevating conveyor and transverse conveyor and below and to the rear of the shaking and elevating conveyor, the rotation of said rollers being in directions operative to substantially reverse the directions of movement of vines discharged from the shaking and elevating conveyor whereby such vines are withdrawn out of the path of potatoes discharged from said shaking and elevating conveyor, another set of upper and lower rollers operatively mounted contiguous to the discharge end of said transverse conveyor, said axes of the rollers lying in a plane downwardly and forwardly inclined with respect to the discharge end of the transverse conveyor, and independent drive means for actuating the rollers of each set, and belt means operatively mounted upon the rollers, whereby the shaking and elevating conveyor and its contiguous set of belt means and the transverse conveyor and its set of belt means are adapted to be either independently or simultaneously actuated.

24. A potato digger according to claim 23, comprising a forwardly inclined sorting and elevating conveyor operatively mounted on the mobile frame and adapted to receive the unsorted potatoes and trash discharged from the transverse conveyor, an elevating conveyor transverse to the shaking and elevating conveyor and sorting and elevating conveyor and operatively mounted on the front of the mobile frame to receive the cleaned and sorted potatoes from the sorting and elevating conveyor, drive means for driving said conveyors and each of said devining means operatively connected together, and another drive means for operating the transverse conveyor and its devining means and the sorting and elevating conveyor and transverse conveyor, all operatively connected together, independently of the shaking and elevating conveyor and its contiguous devining means.

25. A potato digger according to claim 1, wherein said digging means includes a plurality of digger units and said conveying means includes a shaking and elevating conveyor for each of said digger units, said devining means provided for each of said digger units and also comprising belt means contacting at the upper end and divergent at their lower ends for each of the shaking and elevating conveyors and the lower ends of each belt means extending forwardly beneath each shaking and elevating conveyor whereby said belt means is operative to withdraw vines discharged from said shaking and elevating conveyors out of the path of potatoes discharged from said shaking and elevating conveyors, a transverse conveyor and a devining means therefor adapted to receive material from each of the shaking and elevating conveyors after traversing their respective devining means, said belt means including means for adjusting the openings between their lower ends, and sorting and elevating conveying means operatively mounted on the mobile frame and adapted to receive material discharged from the transverse conveyor after traversing its respective devining means, and drive means for independently operating the transverse conveyor its contiguous devining means and the sorting and elevating conveying means, all operatively connected together, whereby excess material may be removed from the transverse conveyor, its devining means and sorting and elevating conveying means without receiving material from the shaking and elevating conveyors after it has been discharged over their respective devining means.

26. A potato digger according to claim 1, wherein said digging means includes laterally spaced digger units contiguously mounted together and said conveying means comprising a shaking conveyor for each of said digger units, and including a transverse conveyor receiving the material discharged from the shaking conveyors, said devining means provided for each digger unit operatively mounted at the upper end of each shaking conveyor for discharging devined potatoes upon said transverse conveyor and the vines forwardly underneath said shaking conveyor of each digger unit whereby said vines do not interfere with the discharge of potatoes onto said transverse conveyor, an upwardly and forwardly extending sorting conveyor operatively positioned laterally with respect to said digger units, additional devining means between the discharge end of the transverse conveyor and sorting conveyor for further devining and discharge of additional vines beneath the transverse conveyor and potatoes from the transverse conveyor to the sorting conveyor, a transverse loading conveyor operatively mounted at the upper end of the sorting conveyor, and inclined upwardly over the shaking conveyor of each digger unit to discharge laterally thereof, auxiliary power means operatively positioned to the rear of the transverse loading conveyor and above the shaking conveyors, drive means operatively connecting the conveyors and devining means to the power means, and change speed mechanism operatively connected to drive means for controlling the speed and direction of the conveyors in a predetermined relationship.

27. A potato digger according to claim 26, and including hydraulic lift means operatively connected to the digger units, manually adjusting means operatively connected to said hydraulic lift means for adjusting the hydraulic lift means operatively connected to the hydraulic lift means for operatively controlling the raising and lowering of each digger unit.

28. A potato digger according to claim 26, and comprising a bagging station operatively mounted on the mobile frame and at the end of the transverse loading conveyor.

29. A potato digger according to claim 26, and comprising an extension for the transverse loading conveyor including pivoted conveyor sections vertically adjustable with respect to each other, and hydraulic actuating means operatively connected to each section, and control means operatively connected to the hydraulic actuating means for adjusting each section with respect to the other and to the transverse loading conveyor.

30. A potato digger according to claim 26, and comprising an operator's station operatively mounted on the mobile frame forward of the transverse loading elevator, said transverse loading elevator including vertically movable sections, hydraulic power means operatively mounted on the mobile frame, hydraulic adjusting means for each of the sections operatively connected to the hydraulic power means, hydraulic lifting means for each of the digger units operatively connected to the hydraulic power means, and control means for the hydraulic adjusting means and lift means operatively connected to the hydraulic power means, and control means for the auxiliary power means and change speed mechanism operatively mounted contiguous to the operator's station.

31. A potato digger according to claim 1, wherein said digging means includes a plurality of laterally spaced digger units, and said conveying means includes a shaking conveyor for each of said digger units, and including a transverse conveyor receiving material discharged from said shaking conveyors, said devining means provided for each of said digger units for discharging devined potatoes on the transverse conveyor and the vines forwardly underneath each shaking conveyor whereby such vines do not interfere with the discharge of potatoes to the transverse conveyor, and power means including control mechanism operatively connected to the shaking conveyors and transverse conveyor for operatively controlling the shaking conveyors and transverse conveyor.

32. A potato digger according to claim 31, and including another devining means operatively mounted at the discharge end of the transverse conveyor for further devining and discharge of the vines laterally beneath the transverse conveyor and the potatoes in the opposite direction, and drive means operatively connected to said power means for actuating said last-mentioned devining means and transverse conveyor together.

33. A potato digger according to claim 31, wherein said transverse conveyor is formed as a solid belt and comprising a helical pulley for supporting the flights of the transverse conveyor, whereby upon rotation of said helical pulley trash is discharged from beneath the flights of the transverse conveyor.

34. A potato digger according to claim 1, wherein said cooperating rotary members of said devining means are upper rollers, and said devining means also including lower rollers, a plurality of contacting upper and lower looped and rotating belts operatively mounted to the rear and below the discharge end of the conveying means and operatively mounted on said upper and lower rollers, said inner flights of the rotating belts contacting at their upper ends and diverging at their lower ends, linkage means operatively connected to one end of said rollers over which one of said belts is trained for adjusting the spacing between the lower ends of the inner flights, means operatively connected to the other belt for adjusting the tension of the rotating belts, and said belts positioned beneath the lower flight of the conveyor of the potato digger and extending forwardly, the direction of said belts being such that vines discharged from said conveying means are reversed in direction and withdrawn from the path of potatoes discharged from said conveying means and thus eliminating interference by such vines with the discharge of such potatoes.

35. A potato digger according to claim 1, wherein said digging means includes a plurality of digger units and said conveying means includes elevating and shaking conveyors operatively mounted on said mobile frame for each of said digger units, said devining means provided for each of said elevating and shaking conveyors, and including a transverse conveyor to receive the discharge from said elevating and shaking conveyors, a sorting and elevating conveyor and transverse loading conveyor, power means operatively mounted on the mobile frame for actuating said conveyors and devining means, change speed mechanism including forward and reverse drives operatively connected to said power means, a variable speed drive for adjusting the relative speeds of said conveyors and devining means dependent upon the forward speed of the potato digger and the load upon the various conveyors, and said reverse drives permitting reversal in a direction of said shaking and elevator conveyors.

36. A potato digger according to claim 1, wherein said digging means comprises a plurality of digger units operatively mounted on the mobile frame, and including a transverse loading elevator comprising pivoted sections operatively mounted on the mobile frame, a hydraulic lifting and adjusting mechanism comprising hydraulic power means for placing a fluid under pressure, a hydraulic cylinder operatively connected to the potato digger and to the digger units, control means operatively connected to the hydraulic power means for controlling the fluid to the cylinder to raise and lower the digger units, hydraulic cylinders for each of the pivoted sections of the transverse loading conveyor, and control means operatively connected to the hydraulic power means for each of said last-mentioned cylinders for adjusting each of the sections with respect to each other and to the transverse loading elevator.

References Cited in the file of this patent

UNITED STATES PATENTS

| | | |
|---|---|---|
| 555,251 | Leidiger | Feb. 25, 1896 |
| 922,915 | Kniffen | May 25, 1909 |
| 1,568,482 | Thompson | Jan. 5, 1926 |
| 1,715,218 | Wright et al. | May 28, 1929 |
| 1,761,286 | Zuckerman | June 3, 1930 |
| 1,771,447 | Rice | July 29, 1930 |
| 1,888,504 | Johnson et al. | Nov. 22, 1932 |
| 1,964,637 | Hurxthal | June 26, 1934 |
| 1,988,254 | Smith | Jan. 15, 1935 |
| 2,015,549 | Dwyer et al. | Sept. 24, 1935 |
| 2,146,898 | Johnson et al. | Feb. 14, 1939 |
| 2,351,518 | Johnson et al. | June 13, 1944 |
| 2,365,077 | Hertzler et al. | Dec. 12, 1944 |
| 2,410,918 | Acton | Nov. 12, 1946 |
| 2,438,627 | Walz et al. | Mar. 30, 1948 |
| 2,488,983 | Packman | Nov. 22, 1949 |
| 2,559,965 | Innes | July 10, 1951 |
| 2,569,201 | Smith | Sept. 25, 1951 |
| 2,587,857 | Karlsson | Mar. 4, 1952 |
| 2,601,855 | Johnson | July 1, 1952 |